(12) United States Patent
Bollström et al.

(10) Patent No.: US 10,618,330 B2
(45) Date of Patent: Apr. 14, 2020

(54) METHOD FOR CREATING A HIDDEN PATTERN

(71) Applicant: Omya International AG, Oftringen (CH)

(72) Inventors: Roger Bollström, Zofingen (CH); Joachim Schoelkopf, Oberkulm (CH); Patrick A. C. Gane, Rothrist (CH)

(73) Assignee: Omya International AG, Oftringen (CH)

( * ) Notice: Subject to any disclaimer, the term of this patent is extended or adjusted under 35 U.S.C. 154(b) by 0 days.

(21) Appl. No.: 15/551,161

(22) PCT Filed: Mar. 9, 2016

(86) PCT No.: PCT/EP2016/055050
§ 371 (c)(1),
(2) Date: Aug. 15, 2017

(87) PCT Pub. No.: WO2016/146458
PCT Pub. Date: Sep. 22, 2016

(65) Prior Publication Data
US 2018/0056690 A1 Mar. 1, 2018

Related U.S. Application Data

(60) Provisional application No. 62/135,802, filed on Mar. 20, 2015.

(30) Foreign Application Priority Data

Mar. 13, 2015 (EP) .................................. 15159107

(51) Int. Cl.
*B41M 3/14* (2006.01)
*B41M 3/00* (2006.01)
(Continued)

(52) U.S. Cl.
CPC ................ *B41M 3/148* (2013.01); *B41J 2/01* (2013.01); *B41M 3/001* (2013.01); *B42D 25/21* (2014.10);
(Continued)

(58) Field of Classification Search
CPC .... B41M 3/148; B41M 3/001; B41M 5/5218; B41M 5/0011; B41M 3/142; B41M 3/14;
(Continued)

(56) References Cited

U.S. PATENT DOCUMENTS

2009/0053409 A1 2/2009 Yamamoto et al.
2011/0128557 A1 6/2011 Kinoshita et al.
(Continued)

FOREIGN PATENT DOCUMENTS

DE 2849495 A1 5/1980
DE 102011106094 A1 12/2012
(Continued)

OTHER PUBLICATIONS

International Search Report dated Jun. 14, 2016 for PCT/EP2016/055050.
(Continued)

*Primary Examiner* — Justin V Lewis
(74) *Attorney, Agent, or Firm* — ALGM LLP; Harry J. Guttman

(57) ABSTRACT

The present invention relates to a method for creating a hidden pattern on a substrate, wherein a liquid treatment composition comprising at least one acid is deposited by inkjet printing onto a substrate, which comprises at least one external surface comprising a salifiable alkaline or alkaline earth compound.

24 Claims, 8 Drawing Sheets

(51) Int. Cl.

| | | |
|---|---|---|
| *C09D 11/50* | (2014.01) | |
| *C09D 11/38* | (2014.01) | |
| *C09D 11/328* | (2014.01) | |
| *B42D 25/21* | (2014.01) | |
| *B42D 25/369* | (2014.01) | |
| *B42D 25/373* | (2014.01) | |
| *B42D 25/378* | (2014.01) | |
| *B41J 2/01* | (2006.01) | |
| *B44F 1/02* | (2006.01) | |
| *B41M 5/52* | (2006.01) | |
| *B41M 5/00* | (2006.01) | |
| *B42D 25/23* | (2014.01) | |
| *B42D 25/24* | (2014.01) | |
| *B42D 25/28* | (2014.01) | |
| *B42D 25/29* | (2014.01) | |

(52) U.S. Cl.
CPC ......... *B42D 25/369* (2014.10); *B42D 25/373* (2014.10); *B42D 25/378* (2014.10); *B44F 1/02* (2013.01); *C09D 11/328* (2013.01); *C09D 11/38* (2013.01); *C09D 11/50* (2013.01); *B41M 3/14* (2013.01); *B41M 3/142* (2013.01); *B41M 5/0011* (2013.01); *B41M 5/5218* (2013.01); *B42D 25/23* (2014.10); *B42D 25/24* (2014.10); *B42D 25/28* (2014.10); *B42D 25/29* (2014.10)

(58) Field of Classification Search
CPC .... B42D 25/378; B42D 25/21; B42D 25/369; B42D 25/373; B42D 25/29; B42D 25/28; B42D 25/24; B42D 25/23; C09D 11/38; C09D 11/328; C09D 11/50; B41J 2/01; B44F 1/02
USPC ............ 283/67, 70, 72, 73, 94, 98, 109, 901
See application file for complete search history.

(56) References Cited

U.S. PATENT DOCUMENTS

| | | |
|---|---|---|
| 2012/0031576 A1 | 2/2012 | Gane et al. |
| 2012/0038701 A1 | 2/2012 | Schalkhammer et al. |
| 2012/0328852 A1* | 12/2012 | Tiller ................. B41M 3/14 |
| | | 428/195.1 |
| 2014/0151996 A1 | 6/2014 | Camus |
| 2014/0373757 A1 | 12/2014 | Schoelkopf et al. |

FOREIGN PATENT DOCUMENTS

| | | |
|---|---|---|
| EP | 1712523 A1 | 10/2006 |
| EP | 1712597 A1 | 10/2006 |
| EP | 2028016 A2 | 2/2009 |
| EP | 2159258 A1 | 3/2010 |
| EP | 2184047 A1 | 5/2010 |
| EP | 2264108 A1 | 12/2010 |
| EP | 2264109 A1 | 12/2010 |
| EP | 2371766 A1 | 10/2011 |
| EP | 2447213 A1 | 5/2012 |
| EP | 2524898 A1 | 11/2012 |
| EP | 2626388 A1 | 8/2013 |
| WO | 0039222 A1 | 7/2000 |
| WO | 2005121257 A2 | 12/2005 |
| WO | 2008024542 A1 | 2/2008 |
| WO | 2009074492 A1 | 6/2009 |
| WO | 2010072388 A2 | 7/2010 |
| WO | 2012073994 A1 | 6/2012 |
| WO | 2013142473 A1 | 9/2013 |

OTHER PUBLICATIONS

Written Opinion of the International Searching Authority dated Jun. 14, 2016 for PCT/EP2016/0550504.

* cited by examiner

METHOD FOR CREATING A HIDDEN PATTERN

CROSS-REFERENCE TO RELATED APPLICATIONS

This is a U.S. national phase of PCT Application No. PCT/EP2016/055050, filed Mar. 9, 2016, which claims priority to European Application No. 15159107.0, filed Mar. 13, 2015 and U.S. Provisional Application No. 62/135,802, filed Mar. 20, 2015.

The present invention relates to the field of inkjet printing, and more particular, to a method for creating a hidden pattern on a substrate, a hidden pattern obtainable by said method and its use.

Product and brand piracy are a widespread and worldwide worrying phenomenon, which may result in commercial losses of the affected companies and may decrease brand value and company reputation. According to the Report on EU customs enforcement of intellectual property rights issued by the European Union in 2014, significant increases in counterfeiting were observed for the categories foodstuffs, alcoholic beverages, jewelry and other accessories, mobile phones, CD/DVDs, toys and games, medicines, car parts and accessories and office stationery. However, products such as ink cartridges and toners, sporting articles, cigarettes and other tobacco products, machines and tools, lighters, labels, tags and stickers and textiles are also often subject to counterfeiting.

Consequently, there is an increasing demand for strategic and technical measures for brand protection and anti-counterfeiting.

Furthermore, with the improvements in desktop publishing and colour-photocopiers, the opportunities for document fraud have increased dramatically. Consequently, there is an increasing demand for security elements that can be used to verify the authenticity of a document, e.g., a passport, a driving license, bank card, credit card, certificate, or means of payment.

WO 2008/024542 A1 describes a method, wherein a reflective feature is formed by a direct-write printing process using an ink comprising metallic particles.

US 2014/0151996 A1 relates to security elements with an optical structure making it possible to vary the appearance of the security element when the viewing angle is modified.

For completeness, the applicant would like to mention the unpublished European patent application with filing number 14 169 922.3 in its name, which relates to a method of manufacturing a surface-modified material.

However, there remains a need in the art for reliable security elements, which cannot be easily reproduced, and allow simple and immediate authentication.

Accordingly, it is an object of the present invention to provide a method for creating a reliable security element, which is difficult to counterfeit, and allows a simple and immediate authentication. It is also desirable that the method is easy to implement in existing print facilities. Furthermore, it is desirable that the method can be used for a great variety of substrates.

A further object of the present invention is to provide a method for creating a security element, which can be easily implemented into prior art methods and existing production lines. It is also desirable that the method is suitable for both small and large production volume.

It is also an object of the present invention to provide a covert security element, which is observable for the human eye under specific conditions, and thus, does not require the use of any verification tools. It is also desirable that the covert security element can be equipped with further functionalities making it machine readable and is combinable with prior art security elements.

The foregoing and other objects are solved by the subject-matter as defined herein in the independent claims.

According to one aspect of the present invention, a method for creating a hidden pattern on a substrate, which is invisible when viewed at a first angle relative to the surface of the substrate, and visible when viewed from a second angle relative to the surface of the substrate, is provided, the method comprising the following steps:
a) providing a substrate, wherein the substrate comprises at least one external surface comprising a salifiable alkaline or alkaline earth compound,
b) providing a liquid treatment composition comprising at least one acid, and
c) applying the liquid treatment composition onto the at least one external surface in form of a preselected pattern by inkjet printing to form a hidden pattern,
wherein the liquid treatment composition is applied in form of drops having a volume of less than or equal to 1000 pl, and
wherein the drop spacing is less than or equal to 1000 μm.

As used herein, the abbreviation "pl" refers to the unit "pico litre" and the abbreviation "fl" refers to the unit "femto litre". As known to the skilled person, 1 pico litre equals $10^{-12}$ litre and 1 femto litre equals $10^{-15}$ litre.

According to another aspect of the present invention, a substrate comprising a hidden pattern, obtainable by a method according to the present invention, is provided.

According to still another aspect of the present invention, a product comprising a substrate according to the present invention is provided, wherein the product is a branded product, a security document, a non-secure document, or a decorative product, preferably the product is a perfume, a drug, a tobacco product, an alcoholic drug, a pharmaceutical product, a dietary product, a bottle, a garment, a packaging, a container, a sporting good, a toy, a game, a mobile phone, a CD, a DVD, a blue ray disk, a machine, a tool, a car part, a sticker, a label, a tag, a poster, a passport, a driving license, a bank card, a credit card, a bond, a ticket, a tax stamp, a banknote, a certificate, a brand authentication tag, a business card, a greeting card, or a wall paper.

According to still another aspect of the present invention, use of a substrate according to the present invention in security applications, in overt security elements, in covert security elements, in brand protection, in microlettering, in micro imaging, in decorative applications, in artistic applications, in visual applications, or in packaging applications is provided.

Advantageous embodiments of the present invention are defined in the corresponding sub-claims.

According to one embodiment the at least one external surface of step a) is in form of a laminate or a coating layer comprising the salifiable alkaline or alkaline earth compound. According to another embodiment the substrate is selected from the group consisting of paper, cardboard, containerboard, plastic, non-wovens, cellophane, textile, wood, metal, glass, mica plate, marble, calcite, nitrocellulose, natural stone, composite stone, brick, concrete, tablet, and laminates or composites thereof, preferably paper, cardboard, containerboard, or plastic. According to still another embodiment the at least one external surface and the substrate of step a) are made from the same material.

According to one embodiment the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or a mixtures thereof, preferably the salifiable alkaline or alkaline earth compound is an alkaline or alkaline earth carbonate being preferably selected from lithium carbonate, sodium carbonate, potassium carbonate, magnesium carbonate, calcium magnesium carbonate, calcium carbonate, or mixtures thereof, more preferably the salifiable alkaline or alkaline earth compound is calcium carbonate, and most preferably the salifiable alkaline or alkaline earth compound is a ground calcium carbonate, a precipitated calcium carbonate and/or a surface-treated calcium carbonate.

According to one embodiment the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulfur compounds, acidic organophosphorus compounds, and mixtures thereof, preferably the at least one acid is selected from the group consisting of hydrochloric acid, sulphuric acid, sulphurous acid, phosphoric acid, oxalic acid, boric acid, suberic acid, succinic acid, sulphamic acid, tartaric acid, and mixtures thereof, more preferably the at least one acid is selected from the group consisting of sulphuric acid, phosphoric acid, boric acid, suberic acid, sulphamic acid, tartaric acid, and mixtures thereof, and most preferably the at least one acid is phosphoric acid and/or sulphuric acid.

According to one embodiment the liquid treatment composition further comprises a fluorescent dye, a phosphorescent dye, an ultraviolet absorbing dye, a near infrared absorbing dye, a thermochromic dye, a halochromic dye, metal ions, transition metal ions, magnetic particles, or a mixture thereof. According to another embodiment the liquid treatment composition comprises the acid in an amount from 0.1 to 100 wt.-%, based on the total weight of the liquid treatment composition, preferably in an amount from 1 to 80 wt.-%, more preferably in an amount from 3 to 60 wt.-%, and most preferably in an amount from 10 to 50 wt.-%.

According to one embodiment the preselected pattern is an one-dimensional bar code, a two-dimensional bar code, a three-dimensional bar code, a security mark, a number, a letter, an alphanumeric symbol, a logo, an image, a shape or a design. According to another embodiment the drops have a volume from 500 pl to 1 fl, preferably from 100 pl to 10 fl, more preferably from 50 pl to 100 fl, and most preferably from 10 pl to 1 pl. According to still another embodiment the drop spacing is from 10 nm to 500 µm, preferably from 100 nm to 300 µm, more preferably from 1 µm to 200 µm, and most preferably from 5 µm to 100 µm.

According to one embodiment the method further comprises a step d) of applying a protective layer and/or a printing layer above the at least one surface-modified region.

According to one embodiment the hidden pattern differs from the at least one external surface in surface roughness, gloss, light absorption, electromagnetic radiation reflection, fluorescence, phosphorescence, magnetic property, electric conductivity, whiteness and/or brightness. According to another embodiment the hidden pattern comprises a security feature and/or a decorative feature, preferably an one-dimensional bar code, a two-dimensional bar code, a three-dimensional bar code, a security mark, a number, a letter, an alphanumeric symbol, a logo, an image, a shape or a design.

It should be understood that for the purpose of the present invention, the following terms have the following meaning.

For the purpose of the present invention, an "acid" is defined as Brønsted-Lowry acid, that is to say, it is an $H_3O^+$ ion provider. In accordance with the present invention, $pK_a$, is the symbol representing the acid dissociation constant associated with a given ionisable hydrogen in a given acid, and is indicative of the natural degree of dissociation of this hydrogen from this acid at equilibrium in water at a given temperature. Such $pK_a$ values may be found in reference textbooks such as Harris, D. C. "Quantitative Chemical Analysis: $3^{rd}$ Edition", 1991, W.H. Freeman & Co. (USA), ISBN 0-7167-2170-8.

The term "basis weight" as used in the present invention is determined according to DIN EN ISO 536:1996, and is defined as the weight in $g/m^2$.

For the purpose of the present invention, the term "coating layer" refers to a layer, covering, film, skin etc., formed, created, prepared etc., from a coating formulation which remains predominantly on one side of the substrate. The coating layer can be in direct contact with the surface of the substrate or, in case the substrate comprises one or more precoating layers and/or barrier layers, can be in direct contact with the top precoating layer or barrier layer, respectively.

For the purpose of the present invention, a "laminate" refers to a sheet of material, which can be applied over a substrate and bonded to the substrate, thereby forming a laminated substrate.

Throughout the present document, the "drop spacing" is defined as the distance between the centres of two successive drops.

The term "liquid treatment composition" as used herein, refers to a composition in liquid from, which comprises at least one acid, and can be applied to an external surface of the substrate of the present invention by inkjet printing.

"Ground calcium carbonate" (GCC) in the meaning of the present invention is a calcium carbonate obtained from natural sources, such as limestone, marble, or chalk, and processed through a wet and/or dry treatment such as grinding, screening and/or fractionating, for example, by a cyclone or classifier.

"Modified calcium carbonate" (MCC) in the meaning of the present invention may feature a natural ground or precipitated calcium carbonate with an internal structure modification or a surface-reaction product, i.e. "surface-reacted calcium carbonate". A "surface-reacted calcium carbonate" is a material comprising calcium carbonate and insoluble, preferably at least partially crystalline, calcium salts of anions of acids on the surface. Preferably, the insoluble calcium salt extends from the surface of at least a part of the calcium carbonate. The calcium ions forming said at least partially crystalline calcium salt of said anion originate largely from the starting calcium carbonate material. MCCs are described, for example, in US 2012/0031576 A1, WO 2009/074492 A1, EP 2 264 109 A1, WO 00/39222 A1, or EP 2 264 108 A1.

"Precipitated calcium carbonate" (PCC) in the meaning of the present invention is a synthesised material, obtained by precipitation following reaction of carbon dioxide and lime in an aqueous, semi-dry or humid environment or by precipitation of a calcium and carbonate ion source in water. PCC may be in the vateritic, calcitic or aragonitic crystal form. PCCs are described, for example, in EP 2 447 213 A1, EP 2 524 898 A1, EP 2 371 766 A1, EP 1 712 597 A1, EP 1 712 523 A1, or WO 2013/142473 A1.

Throughout the present document, the "particle size" of a salifiable alkaline or alkaline earth compound is described by its distribution of particle sizes. The value $d_x$ represents the diameter relative to which x % by weight of the particles have diameters less than $d_x$. This means that the $d_{20}$ value is the particle size at which 20 wt.-% of all particles are smaller, and the $d_{75}$ value is the particle size at which 75 wt.-% of all particles are smaller. The $d_{50}$ value is thus the weight median particle size, i.e. 50 wt.-% of the total weight of all particles results from particles bigger and 50% of the total weight of all particles results from particles smaller than this particles size. For the purpose of the present invention the particle size is specified as weight median particle size $d_{50}$ unless indicated otherwise. For determining the weight median particle size $d_{50}$ value a Sedigraph can be used. The method and the instrument are known to the skilled person and are commonly used to determine grain size of fillers and pigments. The samples are dispersed using a high speed stirrer and supersonics.

A "specific surface area (SSA)" of a salifiable alkaline or alkaline earth compound in the meaning of the present invention is defined as the surface area of the compound divided by its mass. As used herein, the specific surface area is measured by nitrogen gas adsorption using the BET isotherm (ISO 9277:2010) and is specified in $m^2/g$.

For the purpose of the present invention, a "rheology modifier" is an additive that changes the rheological behaviour of a slurry or a liquid coating composition to match the required specification for the coating method employed.

A "salifiable" compound in the meaning of the present invention is defined as a compound that is capable of reacting with an acid to form a salt. Examples of salifiable compounds are alkaline or alkaline earth oxides, hydroxides, alkoxides, methylcarbonates, hydroxycarbonates, bicarbonates, or carbonates.

In the meaning of the present invention, a "surface-treated calcium carbonate" is a ground, precipitated or modified calcium carbonate comprising a treatment or coating layer, e.g. a layer of fatty acids, surfactants, siloxanes, or polymers.

In the present context, the term "substrate" is to be understood as any material having a surface suitable for printing, coating or painting on, such as paper, cardboard, containerboard, plastic, cellophane, textile, wood, metal, glass, mica plate, nitrocellulose, stone, or concrete. The mentioned examples are, however, not of limitative character.

For the purpose of the present invention, the "thickness" and "layer weight" of a layer refers to the thickness and layer weight, respectively, of the layer after the applied coating composition has been dried.

For the purpose of the present invention, the term "viscosity" or "Brookfield viscosity" refers to Brookfield viscosity. The Brookfield viscosity is for this purpose measured by a Brookfield DV-II+ Pro viscometer at 25° C.±1° C. at 100 rpm using an appropriate spindle of the Brookfield RV-spindle set and is specified in mPa·s. Based on his technical knowledge, the skilled person will select a spindle from the Brookfield RV-spindle set which is suitable for the viscosity range to be measured. For example, for a viscosity range between 200 and 800 mPa·s the spindle number 3 may be used, for a viscosity range between 400 and 1 600 mPa·s the spindle number 4 may be used, for a viscosity range between 800 and 3 200 mPa·s the spindle number 5 may be used, for a viscosity range between 1 000 and 2 000 000 mPa·s the spindle number 6 may be used, and for a viscosity range between 4 000 and 8 000 000 mPa·s the spindle number 7 may be used.

A "suspension" or "slurry" in the meaning of the present invention comprises insoluble solids and water, and optionally further additives, and usually contains large amounts of solids and, thus, is more viscous and can be of higher density than the liquid from which it is formed.

For the purpose of the present invention, the term "visible" means that an object fulfils the Rayleigh criteria of having a resolution of $\geq \lambda/2$, and thus, can be recognized at a wave length $\lambda$ using a suitable detection mean such as the human eye, optical microscope, scanning electron microscope, or UV-, IR-, X-ray-, or microwave detectors. The term "invisible" means that an object cannot be recognized under the conditions defined above. According to one embodiment, the term "visible" means that an object can be recognized by the un-aided or naked human eye, preferably under ambient light, and the term "invisible" means that an object cannot be recognized by the un-aided or naked human eye, preferably under ambient light.

Where the term "comprising" is used in the present description and claims, it does not exclude other elements. For the purposes of the present invention, the term "consisting of" is considered to be a preferred embodiment of the term "comprising of". If hereinafter a group is defined to comprise at least a certain number of embodiments, this is also to be understood to disclose a group, which preferably consists only of these embodiments.

Whenever the terms "including" or "having" are used, these terms are meant to be equivalent to "comprising" as defined above.

Where an indefinite or definite article is used when referring to a singular noun, e.g. "a", "an" or "the", this includes a plural of that noun unless something else is specifically stated.

Terms like "obtainable" or "definable" and "obtained" or "defined" are used interchangeably. This e.g. means that, unless the context clearly dictates otherwise, the term "obtained" does not mean to indicate that e.g. an embodiment must be obtained by e.g. the sequence of steps following the term "obtained" even though such a limited understanding is always included by the terms "obtained" or "defined" as a preferred embodiment.

According to the present invention, a method for creating a hidden pattern on a substrate is provided, wherein the pattern is invisible when viewed at a first angle relative to the surface of the substrate, and visible when viewed from a second angle relative to the surface of the substrate. The method comprising the steps of (a) providing a substrate, wherein the substrate comprises at least one external surface comprising a salifiable alkaline or alkaline earth compound, (b) providing a liquid treatment composition comprising at least one acid, and (c) applying the liquid treatment composition onto the at least one external surface in form of a preselected pattern by inkjet printing to form a hidden pattern. The liquid treatment composition is applied in form of drops having a volume of less than or equal to 1000 pl, and the drop spacing is less than or equal to 1000 µm.

In the following the details and preferred embodiments of the inventive method will be set out in more details. It is to be understood that these technical details and embodiments also apply to the inventive hidden pattern and the inventive use thereof as well as to products containing the same.

Method Step a)

According to step a) of the method of the present invention, a substrate is provided.

The substrate comprises at least one external surface and may be opaque, translucent, or transparent.

According to one embodiment, the substrate is selected from the group comprising paper, cardboard, containerboard, plastic, non-wovens, cellophane, textile, wood, metal, glass, mica plate, marble, calcite, nitrocellulose, natural stone, composite stone, brick, concrete, tablet, and laminates or composites thereof. According to a preferred embodiment, the substrate is selected from the group comprising paper, cardboard, containerboard, or plastic. According to another embodiment, the substrate is a laminate of paper, plastic and/or metal, wherein preferably the plastic and/or metal are in form of thin foils such as for example used in Tetra Pak. According to still another embodiment, the substrate is a tablet, for example, a pharmaceutical tablet and/or a dietary supplement tablet. According to a preferred embodiment, the tablet is a compressed tablet, a chewable tablet, a multilayer tablet, a press-coated tablet, a sustained-release tablet, a matrix tablet, a film-coated tablet, an enteric-coated tablet, or an effervescent tablet, and more preferably an effervescent tablet. However, any other material having a surface suitable for printing, coating or painting on may also be used as substrate.

According to one embodiment of the present invention, the substrate is paper, cardboard, or containerboard. Cardboard may comprise carton board or boxboard, corrugated cardboard, or non-packaging cardboard such as chromoboard, or drawing cardboard. Containerboard may encompass linerboard and/or a corrugating medium. Both linerboard and a corrugating medium are used to produce corrugated board. The paper, cardboard, or containerboard substrate can have a basis weight from 10 to 1000 $g/m^2$, from 20 to 800 $g/m^2$, from 30 to 700 $g/m^2$, or from 50 to 600 $g/m^2$. According to one embodiment, the substrate is paper, preferably having a basis weight from 10 to 400 $g/m^2$, 20 to 300 $g/m^2$, 30 to 200 $g/m^2$, 40 to 100 $g/m^2$, 50 to 90 $g/m^2$, 60 to 80 $g/m^2$, or about 70 $g/m^2$.

According to another embodiment, the substrate is a plastic substrate. Suitable plastic materials are, for example, polyethylene, polypropylene, polyvinylchloride, polyesters, polycarbonate resins, or fluorine-containing resins, preferably polypropylene. Examples for suitable polyesters are poly(ethylene terephthalate), poly(ethylene naphthalate) or poly(ester diacetate). An example for a fluorine-containing resins is poly(tetrafluoro ethylene). The plastic substrate may be filled by a mineral filler, an organic pigment, an inorganic pigment, or mixtures thereof.

The substrate may consist of only one layer of the above-mentioned materials or may comprise a layer structure having several sublayers of the same material or different materials. According to one embodiment, the substrate is structured by one layer. According to another embodiment the substrate is structured by at least two sublayers, preferably three, five, or seven sublayers, wherein the sublayers can have a flat or non-flat structure, e.g. a corrugated structure. Preferably the sublayers of the substrate are made from paper, cardboard, containerboard and/or plastic.

The substrate may be permeable or impermeable for solvents, water, or mixtures thereof. According to one embodiment, the substrate is impermeable for water, solvents, or mixtures thereof. Examples for solvents aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to the present invention, the substrate provided in step a) comprises at least one external surface comprising a salifiable alkaline or alkaline earth compound. The at least one external surface may be a laminate or a coating layer, comprising a salifiable alkaline or alkaline earth compound. The laminate or the coating layer can be in direct contact with the surface of the substrate. In case the substrate already comprises one or more precoating layers and/or barrier layers (which will be described in more detail further below), the laminate or coating layer may be in direct contact with the top precoating layer or barrier layer, respectively.

According to one embodiment the at least one external surface and the substrate of step a) are made from the same material. Thus, according to one embodiment of the present invention the substrate comprises a salifiable alkaline or alkaline earth compound. The at least one external surface can be simply the external surface of the substrate or can be a laminate or a coating layer made from the same material as the substrate.

According to one embodiment, the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or a mixtures thereof. Preferably, the salifiable alkaline or alkaline earth compound is an alkaline or alkaline earth carbonate.

The alkaline or alkaline earth carbonate may be selected from lithium carbonate, sodium carbonate, potassium carbonate, magnesium carbonate, calcium magnesium carbonate, calcium carbonate, or mixtures thereof. According to a preferred embodiment, the alkaline or alkaline earth carbonate is calcium carbonate, and more preferably the alkaline or alkaline earth carbonate is a ground calcium carbonate, a precipitated calcium carbonate and/or a surface-treated calcium carbonate.

Ground (or natural) calcium carbonate (GCC) is understood to be manufactured from a naturally occurring form of calcium carbonate, mined from sedimentary rocks such as limestone or chalk, or from metamorphic marble rocks, eggshells or seashells. Calcium carbonate is known to exist as three types of crystal polymorphs: calcite, aragonite and vaterite. Calcite, the most common crystal polymorph, is considered to be the most stable crystal form of calcium carbonate. Less common is aragonite, which has a discrete or clustered needle orthorhombic crystal structure. Vaterite is the rarest calcium carbonate polymorph and is generally unstable. Ground calcium carbonate is almost exclusively of the calcitic polymorph, which is said to be trigonal-rhombohedral and represents the most stable of the calcium carbonate polymorphs. The term "source" of the calcium carbonate in the meaning of the present application refers to the naturally occurring mineral material from which the calcium carbonate is obtained. The source of the calcium carbonate may comprise further naturally occurring components such as magnesium carbonate, alumino silicate etc.

According to one embodiment of the present invention the GCC is obtained by dry grinding. According to another embodiment of the present invention the GCC is obtained by wet grinding and optionally subsequent drying.

In general, the grinding step can be carried out with any conventional grinding device, for example, under conditions such that comminution predominantly results from impacts with a secondary body, i.e. in one or more of: a ball mill, a rod mill, a vibrating mill, a roll crusher, a centrifugal impact mill, a vertical bead mill, an attrition mill, a pin mill, a hammer mill, a pulveriser, a shredder, a de-clumper, a knife cutter, or other such equipment known to the skilled man. In case the calcium carbonate containing mineral material comprises a wet ground calcium carbonate containing mineral material, the grinding step may be performed under conditions such that autogenous grinding takes place and/or by horizontal ball milling, and/or other such processes known to the skilled man. The wet processed ground calcium carbonate containing mineral material thus obtained may be washed and dewatered by well-known processes, e.g. by flocculation, centrifugation, filtration or forced evaporation prior to drying. The subsequent step of drying may be carried out in a single step such as spray drying, or in at least two steps. It is also common that such a mineral material undergoes a beneficiation step (such as a flotation, bleaching or magnetic separation step) to remove impurities.

According to one embodiment of the present invention, the ground calcium carbonate is selected from the group consisting of marble, chalk, dolomite, limestone and mixtures thereof.

According to one embodiment of the present invention, the calcium carbonate comprises one type of ground calcium carbonate. According to another embodiment of the present invention, the calcium carbonate comprises a mixture of two or more types of ground calcium carbonates selected from different sources.

"Precipitated calcium carbonate" (PCC) in the meaning of the present invention is a synthesized material, generally obtained by precipitation following reaction of carbon dioxide and lime in an aqueous environment or by precipitation of a calcium and carbonate ion source in water or by precipitation of calcium and carbonate ions, for example $CaCl_2$ and $Na_2CO_3$, out of solution. Further possible ways of producing PCC are the lime soda process, or the Solvay process in which PCC is a by-product of ammonia production. Precipitated calcium carbonate exists in three primary crystalline forms: calcite, aragonite and vaterite, and there are many different polymorphs (crystal habits) for each of these crystalline forms. Calcite has a trigonal structure with typical crystal habits such as scalenohedral (S-PCC), rhombohedral (R-PCC), hexagonal prismatic, pinacoidal, colloidal (C-PCC), cubic, and prismatic (P-PCC). Aragonite is an orthorhombic structure with typical crystal habits of twinned hexagonal prismatic crystals, as well as a diverse assortment of thin elongated prismatic, curved bladed, steep pyramidal, chisel shaped crystals, branching tree, and coral or wormlike form. Vaterite belongs to the hexagonal crystal system. The obtained PCC slurry can be mechanically dewatered and dried.

According to one embodiment of the present invention, the calcium carbonate comprises one precipitated calcium carbonate. According to another embodiment of the present invention, the calcium carbonate comprises a mixture of two or more precipitated calcium carbonates selected from different crystalline forms and different polymorphs of precipitated calcium carbonate. For example, the at least one precipitated calcium carbonate may comprise one PCC selected from S-PCC and one PCC selected from R-PCC.

According to another embodiment, the salifiable alkaline or alkaline earth compound may be surface-treated material, for example, a surface-treated calcium carbonate.

A surface-treated calcium carbonate may feature a ground calcium carbonate, a modified calcium carbonate, or a precipitated calcium carbonate comprising a treatment or coating layer on its surface. For example, the calcium carbonate may be treated or coated with a hydrophobising agent such as, e.g., aliphatic carboxylic acids, salts or esters thereof, or a siloxane. Suitable aliphatic acids are, for example, $C_5$ to $C_{28}$ fatty acids such as stearic acid, palmitic acid, myristic acid, lauric acid, or a mixture thereof. The calcium carbonate may also be treated or coated to become cationic or anionic with, for example, a polyacrylate or polydiallyldimethyl-ammonium chloride (polyDADMAC). Surface-treated calcium carbonates are, for example, described in EP 2 159 258 A1 or WO 2005/121257 A1.

According to one embodiment, the surface-treated calcium carbonate comprises a treatment layer or surface coating obtained from the treatment with fatty acids, their salts, their esters, or combinations thereof, preferably from the treatment with aliphatic $C_5$ to $C_{28}$ fatty acids, their salts, their esters, or combinations thereof, and more preferably from the treatment with ammonium stearate, calcium stearate, stearic acid, palmitic acid, myristic acid, lauric acid, or mixtures thereof. According to an exemplary embodiment, the alkaline or alkaline earth carbonate is a surface-treated calcium carbonate, preferably a ground calcium carbonate comprising a treatment layer or surface coating obtained from the treatment with a fatty acid, preferably stearic acid.

In one embodiment, the hydrophobising agent is an aliphatic carboxylic acid having a total amount of carbon atoms from C4 to C24 and/or reaction products thereof. Accordingly, at least a part of the accessible surface area of the calcium carbonate particles is covered by a treatment layer comprising an aliphatic carboxylic acid having a total amount of carbon atoms from C4 to C24 and/or reaction products thereof. The term "accessible" surface area of a material refers to the part of the material surface which is in contact with a liquid phase of an aqueous solution, suspension, dispersion or reactive molecules such as a hydrophobising agent.

The term "reaction products" of the aliphatic carboxylic acid in the meaning of the present invention refers to products obtained by contacting the at least one calcium carbonate with the at least one aliphatic carboxylic acid. Said reaction products are formed between at least a part of the applied at least one aliphatic carboxylic acid and reactive molecules located at the surface of the calcium carbonate particles.

The aliphatic carboxylic acid in the meaning of the present invention may be selected from one or more straight chain, branched chain, saturated, unsaturated and/or alicyclic carboxylic acids. Preferably, the aliphatic carboxylic acid is a monocarboxylic acid, i.e. the aliphatic carboxylic acid is characterized in that a single carboxyl group is present. Said carboxyl group is placed at the end of the carbon skeleton.

In one embodiment of the present invention, the aliphatic carboxylic acid is selected from saturated unbranched carboxylic acids, that is to say the aliphatic carboxylic acid is preferably selected from the group of carboxylic acids consisting of pentanoic acid, hexanoic acid, heptanoic acid, octanoic acid, nonanoic acid, decanoic acid, undecanoic acid, lauric acid, tridecanoic acid, myristic acid, pentadecanoic acid, palmitic acid, heptadecanoic acid, stearic acid, nonadecanoic acid, arachidic acid, heneicosylic acid, behenic acid, tricosylic acid, lignoceric acid and mixtures thereof.

In another embodiment of the present invention, the aliphatic carboxylic acid is selected from the group consisting of octanoic acid, decanoic acid, lauric acid, myristic acid, palmitic acid, stearic acid, arachidic acid and mixtures thereof. Preferably, the aliphatic carboxylic acid is selected from the group consisting of myristic acid, palmitic acid, stearic acid and mixtures thereof. For example, the aliphatic carboxylic acid is stearic acid.

Additionally or alternatively, the hydrophobising agent can be at least one mono-substituted succinic anhydride consisting of succinic anhydride mono-substituted with a group selected from a linear, branched, aliphatic and cyclic group having a total amount of carbon atoms from C2 to C30 in the substituent. Accordingly, at least a part of the accessible surface area of the calcium carbonate particles is covered by a treatment layer comprising at least one mono-substituted succinic anhydride consisting of succinic anhydride mono-substituted with a group selected from a linear, branched, aliphatic and cyclic group having a total amount of carbon atoms from C2 to C30 in the substituent and/or reaction products thereof. It will be appreciated by the skilled person that in case the at least one mono-substituted succinic anhydride consists of succinic anhydride mono-substituted with a branched and/or cyclic group, said group will have a total amount of carbon atoms from C3 to C30 in the substituent.

The term "reaction products" of the mono-substituted succinic anhydride in the meaning of the present invention refers to products obtained by contacting the calcium carbonate with the at least one mono-substituted succinic anhydride. Said reaction products are formed between at least a part of the applied at least one mono-substituted succinic anhydride and reactive molecules located at the surface of the calcium carbonate particles.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent or a branched alkyl group having a total amount of carbon atoms from C3 to C30, preferably from C3 to C20 and most preferably from C4 to C18 in the substituent.

For example, the at least one mono-substituted succinic anhydride consists of succinic anhydride mono-substituted with one group being a linear alkyl group having a total amount of carbon atoms from C2 to C30, preferably from C3 to C20 and most preferably from C4 to C18 in the substituent. Additionally or alternatively, the at least one mono-substituted succinic anhydride consists of succinic anhydride mono-substituted with one group being a branched alkyl group having a total amount of carbon atoms from C3 to C30, preferably from C3 to C20 and most preferably from C4 to C18 in the substituent.

The term "alkyl" in the meaning of the present invention refers to a linear or branched, saturated organic compound composed of carbon and hydrogen. In other words, "alkyl mono-substituted succinic anhydrides" are composed of linear or branched, saturated hydrocarbon chains containing a pendant succinic anhydride group.

In one embodiment of the present invention, the at least one mono-substituted succinic anhydride is at least one linear or branched alkyl mono-substituted succinic anhydride. For example, the at least one alkyl mono-substituted succinic anhydride is selected from the group comprising ethylsuccinic anhydride, propylsuccinic anhydride, butylsuccinic anhydride, triisobutyl succinic anhydride, pentylsuccinic anhydride, hexylsuccinic anhydride, heptylsuccinic anhydride, octylsuccinic anhydride, nonylsuccinic anhydride, decyl succinic anhydride, dodecyl succinic anhydride, hexadecanyl succinic anhydride, octadecanyl succinic anhydride, and mixtures thereof.

It is appreciated that e.g. the term "butylsuccinic anhydride" comprises linear and branched butylsuccinic anhydride(s). One specific example of linear butylsuccinic anhydride(s) is n-butylsuccinic anhydride. Specific examples of branched butylsuccinic anhydride(s) are iso-butylsuccinic anhydride, sec-butylsuccinic anhydride and/or tert-butylsuccinic anhydride.

Furthermore, it is appreciated that e.g. the term "hexadecanyl succinic anhydride" comprises linear and branched hexadecanyl succinic anhydride(s). One specific example of linear hexadecanyl succinic anhydride(s) is n-hexadecanyl succinic anhydride. Specific examples of branched hexadecanyl succinic anhydride(s) are 14-methylpentadecanyl succinic anhydride, 13-methylpentadecanyl succinic anhydride, 12-methylpentadecanyl succinic anhydride, 11-methylpentadecanyl succinic anhydride, 10-methylpentadecanyl succinic anhydride, 9-methylpentadecanyl succinic anhydride, 8-methylpentadecanyl succinic anhydride, 7-methylpentadecanyl succinic anhydride, 6-methylpentadecanyl succinic anhydride, 5-methylpentadecanyl succinic anhydride, 4-methylpentadecanyl succinic anhydride, 3-methylpentadecanyl succinic anhydride, 2-methylpentadecanyl succinic anhydride, 1-methylpentadecanyl succinic anhydride, 13-ethylbutadecanyl succinic anhydride, 12-ethylbutadecanyl succinic anhydride, 11-ethylbutadecanyl succinic anhydride, 10-ethylbutadecanyl succinic anhydride, 9-ethylbutadecanyl succinic anhydride, 8-ethylbutadecanyl succinic anhydride, 7-ethylbutadecanyl succinic anhydride, 6-ethylbutadecanyl succinic anhydride, 5-ethylbutadecanyl succinic anhydride, 4-ethylbutadecanyl succinic anhydride, 3-ethylbutadecanyl succinic anhydride, 2-ethylbutadecanyl succinic anhydride, 1-ethylbutadecanyl succinic anhydride, 2-butyldodecanyl succinic anhydride, 1-hexyldecanyl succinic anhydride, 1-hexyl-2-decanyl succinic anhydride, 2-hexyldecanyl succinic anhydride, 6,12-dimethylbutadecanyl succinic anhydride, 2,2-diethyldodecanyl succinic anhydride, 4,8,12-trimethyltridecanyl succinic anhydride, 2,2,4,6,8-pentamethylundecanyl succinic anhydride, 2-ethyl-4-methyl-2-(2-methylpentyl)-heptyl succinic anhydride and/or 2-ethyl-4,6-dimethyl-2-propylnonyl succinic anhydride.

Furthermore, it is appreciated that e.g. the term "octadecanyl succinic anhydride" comprises linear and branched octadecanyl succinic anhydride(s). One specific example of linear octadecanyl succinic anhydride(s) is n-octadecanyl succinic anhydride.

Specific examples of branched hexadecanyl succinic anhydride(s) are 16-methylheptadecanyl succinic anhydride, 15-methylheptadecanyl succinic anhydride, 14-methylheptadecanyl succinic anhydride, 13-methylheptadecanyl succinic anhydride, 12-methylheptadecanyl succinic anhydride, 11-methylheptadecanyl succinic anhydride, 10-methylheptadecanyl succinic anhydride, 9-methylheptadecanyl succinic anhydride, 8-methylheptadecanyl succinic anhydride, 7-methylheptadecanyl succinic anhydride, 6-methylheptadecanyl succinic anhydride, 5-methylheptadecanyl succinic anhydride, 4-methylheptadecanyl succinic anhydride, 3-methylheptadecanyl succinic anhydride, 2-methylheptadecanyl succinic anhydride, 1-methylheptadecanyl succinic anhydride, 14-ethylhexadecanyl succinic anhydride, 13-ethylhexadecanyl succinic anhydride, 12-ethylhexadecanyl succinic anhydride, 11-ethylhexadecanyl succinic anhydride, 10-ethylhexadecanyl succinic anhydride, 9-ethylhexadecanyl succinic anhydride, 8-ethylhexadecanyl succinic anhydride, 7-ethylhexadecanyl succinic anhydride, 6-ethylhexadecanyl succinic anhydride, 5-ethylhexadecanyl succinic anhydride, 4-ethylhexadecanyl succinic anhydride, 3-ethylhexadecanyl succinic anhydride, 2-ethylhexadecanyl succinic anhydride, 1-ethylhexadecanyl succinic anhydride, 2-hexyldodecanyl succinic anhydride, 2-heptylundecanyl succinic anhydride, iso-octadecanyl succinic anhydride and/or 1-octyl-2-decanyl succinic anhydride.

In one embodiment of the present invention, the at least one alkyl mono-substituted succinic anhydride is selected from the group comprising butylsuccinic anhydride, hexylsuccinic anhydride, heptylsuccinic anhydride, octylsuccinic anhydride, hexadecanyl succinic anhydride, octadecanyl succinic anhydride, and mixtures thereof.

In one embodiment of the present invention, the at least one mono-substituted succinic anhydride is one kind of alkyl mono-substituted succinic anhydride. For example, the one alkyl mono-substituted succinic anhydride is butylsuccinic anhydride.

Alternatively, the one alkyl mono-substituted succinic anhydride is hexylsuccinic anhydride. Alternatively, the one alkyl mono-substituted succinic anhydride is heptylsuccinic anhydride or octylsuccinic anhydride. Alternatively, the one alkyl mono-substituted succinic anhydride is hexadecanyl succinic anhydride. For example, the one alkyl mono-substituted succinic anhydride is linear hexadecanyl succinic anhydride such as n-hexadecanyl succinic anhydride or branched hexadecanyl succinic anhydride such as 1-hexyl-2-decanyl succinic anhydride. Alternatively, the one alkyl mono-substituted succinic anhydride is octadecanyl succinic anhydride. For example, the one alkyl mono-substituted succinic anhydride is linear octadecanyl succinic anhydride such as n-octadecanyl succinic anhydride or branched octadecanyl succinic anhydride such as iso-octadecanyl succinic anhydride or 1-octyl-2-decanyl succinic anhydride.

In one embodiment of the present invention, the one alkyl mono-substituted succinic anhydride is butylsuccinic anhydride such as n-butylsuccinic anhydride.

In one embodiment of the present invention, the at least one mono-substituted succinic anhydride is a mixture of two or more kinds of alkyl mono-substituted succinic anhydrides. For example, the at least one mono-substituted succinic anhydride is a mixture of two or three kinds of alkyl mono-substituted succinic anhydrides.

In one embodiment of the present invention, the at least one mono-substituted succinic anhydride consists of succinic anhydride mono-substituted with one group being a linear alkenyl group having a total amount of carbon atoms from C2 to C30, preferably from C3 to C20 and most preferably from C4 to C18 in the substituent or a branched alkenyl group having a total amount of carbon atoms from C3 to C30, preferably from C4 to C20 and most preferably from C4 to C18 in the substituent.

The term "alkenyl" in the meaning of the present invention refers to a linear or branched, unsaturated organic compound composed of carbon and hydrogen. Said organic compound further contains at least one double bond in the substituent, preferably one double bond. In other words, "alkenyl mono-substituted succinic anhydrides" are composed of linear or branched, unsaturated hydrocarbon chains containing a pendant succinic anhydride group. It is appreciated that the term "alkenyl" in the meaning of the present invention includes the cis and trans isomers.

In one embodiment of the present invention, the at least one mono-substituted succinic anhydride is at least one linear or branched alkenyl mono-substituted succinic anhydride. For example, the at least one alkenyl mono-substituted succinic anhydride is selected from the group comprising ethenylsuccinic anhydride, propenylsuccinic anhydride, butenylsuccinic anhydride, triisobutenyl succinic anhydride, pentenylsuccinic anhydride, hexenylsuccinic anhydride, heptenylsuccinic anhydride, octenylsuccinic anhydride, nonenylsuccinic anhydride, decenyl succinic anhydride, dodecenyl succinic anhydride, hexadecenyl succinic anhydride, octadecenyl succinic anhydride, and mixtures thereof.

Accordingly, it is appreciated that e.g. the term "hexadecenyl succinic anhydride" comprises linear and branched hexadecenyl succinic anhydride(s). One specific example of linear hexadecenyl succinic anhydride(s) is n-hexadecenyl succinic anhydride such as 14-hexadecenyl succinic anhydride, 13-hexadecenyl succinic anhydride, 12-hexadecenyl succinic anhydride, 11-hexadecenyl succinic anhydride, 10-hexadecenyl succinic anhydride, 9-hexadecenyl succinic anhydride, 8-hexadecenyl succinic anhydride, 7-hexadecenyl succinic anhydride, 6-hexadecenyl succinic anhydride, 5-hexadecenyl succinic anhydride, 4-hexadecenyl succinic anhydride, 3-hexadecenyl succinic anhydride and/or 2-hexadecenyl succinic anhydride. Specific examples of branched hexadecenyl succinic anhydride(s) are 14-methyl-9-pentadecenyl succinic anhydride, 14-methyl-2-pentadecenyl succinic anhydride, 1-hexyl-2-decenyl succinic anhydride and/or iso-hexadecenyl succinic anhydride.

Furthermore, it is appreciated that e.g. the term "octadecenyl succinic anhydride" comprises linear and branched octadecenyl succinic anhydride(s). One specific example of linear octadecenyl succinic anhydride(s) is n-octadecenyl succinic anhydride such as 16-octadecenyl succinic anhydride, 15-octadecenyl succinic anhydride, 14-octadecenyl succinic anhydride, 13-octadecenyl succinic anhydride, 12-octadecenyl succinic anhydride, 11-octadecenyl succinic anhydride, 10-octadecenyl succinic anhydride, 9-octadecenyl succinic anhydride, 8-octadecenyl succinic anhydride, 7-octadecenyl succinic anhydride, 6-octadecenyl succinic anhydride, 5-octadecenyl succinic anhydride, 4-octadecenyl succinic anhydride, 3-octadecenyl succinic anhydride and/or 2-octadecenyl succinic anhydride. Specific examples of branched octadecenyl succinic anhydride(s) are 16-methyl-9-heptadecenyl succinic anhydride, 16-methyl-7-heptadecenyl succinic anhydride, 1-octyl-2-decenyl succinic anhydride and/or iso-octadecenyl succinic anhydride.

In one embodiment of the present invention, the at least one alkenyl mono-substituted succinic anhydride is selected from the group comprising hexenylsuccinic anhydride, octenylsuccinic anhydride, hexadecenyl succinic anhydride, octadecenyl succinic anhydride, and mixtures thereof.

In one embodiment of the present invention, the at least one mono-substituted succinic anhydride is one alkenyl mono-substituted succinic anhydride. For example, the one alkenyl mono-substituted succinic anhydride is hexenylsuccinic anhydride. Alternatively, the one alkenyl mono-substituted succinic anhydride is octenylsuccinic anhydride. Alternatively, the one alkenyl mono-substituted succinic anhydride is hexadecenyl succinic anhydride. For example, the one alkenyl mono-substituted succinic anhydride is linear hexadecenyl succinic anhydride such as n-hexadecenyl succinic anhydride or branched hexadecenyl succinic anhydride such as 1-hexyl-2-decenyl succinic anhydride. Alternatively, the one alkenyl mono-substituted succinic anhydride is octadecenyl succinic anhydride. For example, the one alkyl mono-substituted succinic anhydride is linear octadecenyl succinic anhydride such as n-octadecenyl succinic anhydride or branched octadecenyl succinic anhydride such iso-octadecenyl succinic anhydride, or 1-octyl-2-decenyl succinic anhydride.

In one embodiment of the present invention, the one alkenyl mono-substituted succinic anhydride is linear octadecenyl succinic anhydride such as n-octadecenyl succinic anhydride. In another embodiment of the present invention, the one alkenyl mono-substituted succinic anhydride is linear octenylsuccinic anhydride such as n-octenylsuccinic anhydride.

If the at least one mono-substituted succinic anhydride is one alkenyl mono-substituted succinic anhydride, it is appreciated that the one alkenyl mono-substituted succinic anhydride is present in an amount of ≥95 wt.-% and preferably of ≥96.5 wt.-%, based on the total weight of the at least one mono-substituted succinic anhydride.

In one embodiment of the present invention, the at least one mono-substituted succinic anhydride is a mixture of two or more kinds of alkenyl mono-substituted succinic anhydrides. For example, the at least one mono-substituted succinic anhydride is a mixture of two or three kinds of alkenyl mono-substituted succinic anhydrides.

In one embodiment of the present invention, the at least one mono-substituted succinic anhydride is a mixture of two or more kinds of alkenyl mono-substituted succinic anhydrides comprising linear hexadecenyl succinic anhydride(s) and linear octadecenyl succinic anhydride(s). Alternatively, the at least one mono-substituted succinic anhydride is a mixture of two or more kinds of alkenyl mono-substituted succinic anhydrides comprising branched hexadecenyl succinic anhydride(s) and branched octadecenyl succinic anhydride(s). For example, the one or more hexadecenyl succinic anhydride is linear hexadecenyl succinic anhydride like n-hexadecenyl succinic anhydride and/or branched hexadecenyl succinic anhydride like 1-hexyl-2-decenyl succinic anhydride. Additionally or alternatively, the one or more octadecenyl succinic anhydride is linear octadecenyl succinic anhydride like n-octadecenyl succinic anhydride and/or branched octadecenyl succinic anhydride like iso-octadecenyl succinic anhydride and/or 1-octyl-2-decenyl succinic anhydride.

It is also appreciated that the at least one mono-substituted succinic anhydride may be a mixture of at least one alkyl mono-substituted succinic anhydrides and at least one alkenyl mono-substituted succinic anhydrides.

If the at least one mono-substituted succinic anhydride is a mixture of at least one alkyl mono-substituted succinic anhydrides and at least one alkenyl mono-substituted succinic anhydrides, it is appreciated that the alkyl substituent of the of at least one alkyl mono-substituted succinic anhydrides and the alkenyl substituent of the of at least one alkenyl mono-substituted succinic anhydrides are preferably the same. For example, the at least one mono-substituted succinic anhydride is a mixture of ethylsuccinic anhydride and ethenylsuccinic anhydride. Alternatively, the at least one mono-substituted succinic anhydride is a mixture of propylsuccinic anhydride and propenylsuccinic anhydride. Alternatively, the at least one mono-substituted succinic anhydride is a mixture of butylsuccinic anhydride and butenylsuccinic anhydride. Alternatively, the at least one mono-substituted succinic anhydride is a mixture of triisobutyl succinic anhydride and triisobutenyl succinic anhydride. Alternatively, the at least one mono-substituted succinic anhydride is a mixture of pentylsuccinic anhydride and pentenylsuccinic anhydride. Alternatively, the at least one mono-substituted succinic anhydride is a mixture of hexylsuccinic anhydride and hexenylsuccinic anhydride. Alternatively, the at least one mono-substituted succinic anhydride is a mixture of heptylsuccinic anhydride and heptenylsuccinic anhydride. Alternatively, the at least one mono-substituted succinic anhydride is a mixture of octylsuccinic anhydride and octenylsuccinic anhydride. Alternatively, the at least one mono-substituted succinic anhydride is a mixture of nonylsuccinic anhydride and nonenylsuccinic anhydride. Alternatively, the at least one mono-substituted succinic anhydride is a mixture of decyl succinic anhydride and decenyl succinic anhydride. Alternatively, the at least one mono-substituted succinic anhydride is a mixture of dodecyl succinic anhydride and dodecenyl succinic anhydride. Alternatively, the at least one mono-substituted succinic anhydride is a mixture of hexadecanyl succinic anhydride and hexadecenyl succinic anhydride. For example, the at least one mono-substituted succinic anhydride is a mixture of linear hexadecanyl succinic anhydride and linear hexadecenyl succinic anhydride or a mixture of branched hexadecanyl succinic anhydride and branched hexadecenyl succinic anhydride. Alternatively, the at least one mono-substituted succinic anhydride is a mixture of octadecanyl succinic anhydride and octadecenyl succinic anhydride. For example, the at least one mono-substituted succinic anhydride is a mixture of linear octadecanyl succinic anhydride and linear octadecenyl succinic anhydride or a mixture of branched octadecanyl succinic anhydride and branched octadecenyl succinic anhydride.

In one embodiment of the present invention, the at least one mono-substituted succinic anhydride is a mixture of nonylsuccinic anhydride and nonenylsuccinic anhydride.

If the at least one mono-substituted succinic anhydride is a mixture of at least one alkyl mono-substituted succinic anhydrides and at least one alkenyl mono-substituted succinic anhydrides, the weight ratio between the at least one alkyl mono-substituted succinic anhydride and the at least one alkenyl mono-substituted succinic anhydride is between 90:10 and 10:90 (wt.-%/wt.-%). For example, the weight ratio between the at least one alkyl mono-substituted succinic anhydride and the at least one alkenyl mono-substituted succinic anhydride is between 70:30 and 30:70 (wt.-%/wt.-%) or between 60:40 and 40:60.

Additionally or alternatively, the hydrophobising agent may be a phosphoric acid ester blend. Accordingly, at least a part of the accessible surface area of the calcium carbonate particles is covered by a treatment layer comprising a phosphoric acid ester blend of one or more phosphoric acid mono-ester and/or reaction products thereof and one or more phosphoric acid di-ester and/or reaction products thereof.

The term "reaction products" of the phosphoric acid mono-ester and one or more phosphoric acid di-ester in the meaning of the present invention refers to products obtained by contacting the calcium carbonate with the at least one phosphoric acid ester blend. Said reaction products are formed between at least a part of the applied phosphoric acid ester blend and reactive molecules located at the surface of the calcium carbonate particles.

The term "phosphoric acid mono-ester" in the meaning of the present invention refers to an o-phosphoric acid molecule mono-esterified with one alcohol molecule selected from unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

The term "phosphoric acid di-ester" in the meaning of the present invention refers to an o-phosphoric acid molecule di-esterified with two alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid mono-ester means that one or more kinds of phosphoric acid mono-ester may be present in the phosphoric acid ester blend.

Accordingly, it should be noted that the one or more phosphoric acid mono-ester may be one kind of phosphoric acid mono-ester. Alternatively, the one or more phosphoric acid mono-ester may be a mixture of two or more kinds of phosphoric acid mono-ester. For example, the one or more phosphoric acid mono-ester may be a mixture of two or three kinds of phosphoric acid mono-ester, like two kinds of phosphoric acid mono-ester.

In one embodiment of the present invention, the one or more phosphoric acid mono-ester consists of an o-phosphoric acid molecule esterified with one alcohol selected from unsaturated or saturated, branched or linear, aliphatic or aromatic alcohols having a total amount of carbon atoms from C6 to C30 in the alcohol substituent. For example, the one or more phosphoric acid mono-ester consists of an o-phosphoric acid molecule esterified with one alcohol selected from unsaturated or saturated, branched or linear, aliphatic or aromatic alcohols having a total amount of carbon atoms from C8 to C22, more preferably from C8 to C20 and most preferably from C8 to C18 in the alcohol substituent.

In one embodiment of the present invention, the one or more phosphoric acid mono-ester is selected from the group comprising hexyl phosphoric acid mono-ester, heptyl phosphoric acid mono-ester, octyl phosphoric acid mono-ester, 2-ethylhexyl phosphoric acid mono-ester, nonyl phosphoric acid mono-ester, decyl phosphoric acid mono-ester, undecyl phosphoric acid mono-ester, dodecyl phosphoric acid mono-ester, tetradecyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof.

For example, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof. In one embodiment of the present invention, the one or more phosphoric acid mono-ester is 2-octyl-1-dodecylphosphoric acid mono-ester.

It is appreciated that the expression "one or more" phosphoric acid di-ester means that one or more kinds of phosphoric acid di-ester may be present in the coating layer of the calcium carbonate and/or the phosphoric acid ester blend.

Accordingly, it should be noted that the one or more phosphoric acid di-ester may be one kind of phosphoric acid di-ester. Alternatively, the one or more phosphoric acid di-ester may be a mixture of two or more kinds of phosphoric acid di-ester. For example, the one or more phosphoric acid di-ester may be a mixture of two or three kinds of phosphoric acid di-ester, like two kinds of phosphoric acid di-ester.

In one embodiment of the present invention, the one or more phosphoric acid di-ester consists of an o-phosphoric acid molecule esterified with two alcohols selected from unsaturated or saturated, branched or linear, aliphatic or aromatic alcohols having a total amount of carbon atoms from C6 to C30 in the alcohol substituent. For example, the one or more phosphoric acid di-ester consists of an o-phosphoric acid molecule esterified with two fatty alcohols selected from unsaturated or saturated, branched or linear, aliphatic or aromatic alcohols having a total amount of carbon atoms from C8 to C22, more preferably from C8 to C20 and most preferably from C8 to C18 in the alcohol substituent.

It is appreciated that the two alcohols used for esterifying the phosphoric acid may be independently selected from the same or different, unsaturated or saturated, branched or linear, aliphatic or aromatic alcohols having a total amount of carbon atoms from C6 to C30 in the alcohol substituent. In other words, the one or more phosphoric acid di-ester may comprise two substituents being derived from the same alcohols or the phosphoric acid di-ester molecule may comprise two substituents being derived from different alcohols.

In one embodiment of the present invention, the one or more phosphoric acid di-ester consists of an o-phosphoric acid molecule esterified with two alcohols selected from the same or different, saturated and linear and aliphatic alcohols having a total amount of carbon atoms from C6 to C30, preferably from C8 to C22, more preferably from C8 to C20 and most preferably from C8 to C18 in the alcohol substituent. Alternatively, the one or more phosphoric acid di-ester consists of an o-phosphoric acid molecule esterified with two alcohols selected from the same or different, saturated and branched and aliphatic alcohols having a total amount of carbon atoms from C6 to C30, preferably from C8 to C22, more preferably from C8 to C20 and most preferably from C8 to C18 in the alcohol substituent.

In one embodiment of the present invention, the one or more phosphoric acid di-ester is selected from the group comprising hexyl phosphoric acid di-ester, heptyl phosphoric acid di-ester, octyl phosphoric acid di-ester, 2-ethylhexyl phosphoric acid di-ester, nonyl phosphoric acid di-ester, decyl phosphoric acid di-ester, undecyl phosphoric acid di-ester, dodecyl phosphoric acid di-ester, tetradecyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof. In one embodiment of the present invention, the one or more phosphoric acid di-ester is 2-octyl-1-dodecylphosphoric acid di-ester.

In one embodiment of the present invention, the one or more phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester, 2-octyl-1-dodecylphosphoric acid mono-ester and mixtures thereof and the one or more phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester, 2-octyl-1-dodecylphosphoric acid di-ester and mixtures thereof.

For example, at least a part of the accessible surface area of the calcium carbonate comprises a phosphoric acid ester blend of one phosphoric acid mono-ester and/or reaction products thereof and one phosphoric acid di-ester and/or reaction products thereof. In this case, the one phosphoric acid mono-ester is selected from the group comprising 2-ethylhexyl phosphoric acid mono-ester, hexadecyl phosphoric acid mono-ester, heptylnonyl phosphoric acid mono-ester, octadecyl phosphoric acid mono-ester, 2-octyl-1-decylphosphoric acid mono-ester and 2-octyl-1-dodecylphosphoric acid mono-ester, the one phosphoric acid di-ester is selected from the group comprising 2-ethylhexyl phosphoric acid di-ester, hexadecyl phosphoric acid di-ester, heptylnonyl phosphoric acid di-ester, octadecyl phosphoric acid di-ester, 2-octyl-1-decylphosphoric acid di-ester and 2-octyl-1-dodecylphosphoric acid di-ester.

The phosphoric acid ester blend comprises the one or more phosphoric acid mono-ester and/or reaction products thereof to the one or more phosphoric acid di-ester and/or reaction products thereof in a specific molar ratio. In particular, the molar ratio of the one or more phosphoric acid mono-ester and/or reaction products thereof to the one or more phosphoric acid di-ester and/or reaction products thereof in the treatment layer and/or the phosphoric acid ester blend is from 1:1 to 1:100, preferably from 1:1.1 to 1:60, more preferably from 1:1.1 to 1:40, even more preferably from 1:1.1 to 1:20 and most preferably from 1:1.1 to 1:10.

The wording "molar ratio of the one or more phosphoric acid mono-ester and reaction products thereof to the one or more phosphoric acid di-ester and reaction products thereof" in the meaning of the present invention refers to the sum of the molecular weight of the phosphoric acid mono-ester molecules and/or the sum of the molecular weight of the phosphoric acid mono-ester molecules in the reaction products thereof to the sum of the molecular weight of the phosphoric acid di-ester molecules and/or the sum of the molecular weight of the phosphoric acid di-ester molecules in the reaction products thereof.

In one embodiment of the present invention, the phosphoric acid ester blend coated on at least a part of the surface of the calcium carbonate may further comprise one or more phosphoric acid tri-ester and/or phosphoric acid and/or reaction products thereof.

The term "phosphoric acid tri-ester" in the meaning of the present invention refers to an o-phosphoric acid molecule tri-esterified with three alcohol molecules selected from the same or different, unsaturated or saturated, branched or linear, aliphatic or aromatic alcohols having a total amount of carbon atoms from C6 to C30, preferably from C8 to C22, more preferably from C8 to C20 and most preferably from C8 to C18 in the alcohol substituent.

It is appreciated that the expression "one or more" phosphoric acid tri-ester means that one or more kinds of phosphoric acid tri-ester may be present on at least a part of the accessible surface area of the calcium carbonate.

Accordingly, it should be noted that the one or more phosphoric acid tri-ester may be one kind of phosphoric acid tri-ester. Alternatively, the one or more phosphoric acid tri-ester may be a mixture of two or more kinds of phosphoric acid tri-ester. For example, the one or more phosphoric acid tri-ester may be a mixture of two or three kinds of phosphoric acid tri-ester, like two kinds of phosphoric acid tri-ester.

According to a preferred embodiment of the present invention, in step a) a substrate is provided, wherein the substrate comprises at least one external surface comprising calcium carbonate, preferably ground calcium carbonate, precipitated calcium carbonate and/or surface-treated calcium carbonate. According to a further preferred embodiment, the at least one externals surface is a coating layer comprising calcium carbonate, preferably ground calcium carbonate, precipitated calcium carbonate and/or surface-treated calcium carbonate.

According to one embodiment, the salifiable alkaline or alkaline earth compound is in form of particles having a weight median particle size $d_{50}$ from 15 nm to 200 µm, preferably from 20 nm to 100 µm, more preferably from 50 nm to 50 µm, and most preferably from 100 nm to 2 µm.

According to one embodiment, the salifiable alkaline or alkaline earth compound has a specific surface area (BET) from 4 to 120 $m^2/g$, preferably from 8 to 50 $m^2/g$, as measured using nitrogen and the BET method according to ISO 9277.

The amount of the salifiable alkaline or alkaline earth compound in the at least one external surface can range from 40 to 99 wt.-%, based on the total weight of the coating layer, preferably from 45 to 98 wt.-%, and more preferably from 60 to 97 wt.-%.

According to one embodiment, the at least one external surface further comprises a binder, preferably in an amount from 1 to 50 wt.-%, based on the total weight of the salifiable alkaline or alkaline earth compound, preferably from 3 to 30 wt.-%, and more preferably from 5 to 15 wt.-%.

Any suitable polymeric binder may be present in the at least one external surface. For example, the polymeric binder may be a hydrophilic polymer such as, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, or rhamsan and mixtures thereof. It is also possible to use other binders such as hydrophobic materials, for example, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable binders are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof.

According to one embodiment, the binder is selected from starch, polyvinylalcohol, styrene-butadiene latex, styrene-acrylate, polyvinyl acetate latex, polyolefines, ethylene acrylate, microfibrillated cellulose, microcrystalline cellulose, nanocellulose, cellulose, carboxymethylcellulose, bio-based latex, or mixtures thereof.

According to another embodiment, the at least one external surface does not comprise a binder.

Other optional additives that may be present in the external surface are, for example, dispersants, milling aids, surfactants, rheology modifiers, lubricants, defoamers, optical brighteners, dyes, preservatives, or pH controlling agents. According to one embodiment, the at least one external surface further comprises a rheology modifier. Preferably the rheology modifier is present in an amount of less than 1 wt.-%, based on the total weight of the filler.

According to an exemplary embodiment, the salifiable alkaline or alkaline earth compound is dispersed with a dispersant. The dispersant may be used in an amount from 0.01 to 10 wt.-%, 0.05 to 8 wt.-%, 0.5 to 5 wt.-%, 0.8 to 3 wt.-%, or 1.0 to 1.5 wt.-%, based on the total weight of the salifiable alkaline or alkaline earth compound. In a preferred embodiment, the salifiable alkaline or alkaline earth compound is dispersed with an amount of 0.05 to 5 wt.-%, and preferably with an amount of 0.5 to 5 wt.-% of a dispersant, based on the total weight of the salifiable alkaline or alkaline earth compound. A suitable dispersant is preferably selected from the group comprising homopolymers or copolymers of polycarboxylic acid salts based on, for example, acrylic acid, methacrylic acid, maleic acid, fumaric acid or itaconic acid and acrylamide or mixtures thereof. Homopolymers or copolymers of acrylic acid are especially preferred. The molecular weight $M_w$ of such products is preferably in the range of 2000 to 15000 g/mol, with a molecular weight $M_w$ of 3000 to 7000 g/mol being especially preferred. The molecular weight $M_w$ of such products is also preferably in the range of 2000 to 150000 g/mol, and an $M_w$ of 15000 to 50 000 g/mol is especially preferred, e.g., 35000 to 45000 g/mol. According to an exemplary embodiment, the dispersant is polyacrylate.

The at least one external surface may also comprise active agents, for example, bioactive molecules as additives, for example, enzymes, chromatic indicators susceptible to change in pH or temperature, or fluorescent materials.

The at least external surface, preferably in form of a laminate or a coating layer, may have a thickness of at least 1 µm, e.g. at least 5 µm, 10 µm, 15 µm or 20 µm. Preferably the external surface has a thickness in the range of 1 µm up to 150 µm.

According to one embodiment, the substrate comprises a first side and a reverse side, and the substrate comprises an external surface comprising a salifiable alkaline or alkaline earth compound on the first side and the reverse side. According to a preferred embodiment, the substrate comprises a first side and a reverse side, and the substrate comprises a laminate or a coating layer comprising an alkaline or alkaline earth carbonate, preferably calcium carbonate, on the first side and the reverse side. According to one embodiment, the laminate or coating layer is in direct contact with the surface of the substrate.

According to a further embodiment, the substrate comprises one or more additional precoating layers between the substrate and the at least one external surface comprising a salifiable alkaline or alkaline earth compound. Such additional precoating layers may comprise kaolin, silica, talc, plastic, precipitated calcium carbonate, modified calcium carbonate, ground calcium carbonate, or mixtures thereof. In this case, the coating layer may be in direct contact with the precoating layer, or, if more than one precoating layer is present, the coating layer may be in direct contact with the top precoating layer.

According to another embodiment of the present invention, the substrate comprises one or more barrier layers between the substrate and the at least one external surface comprising a salifiable alkaline or alkaline earth compound. In this case, the at least one external surface may be in direct contact with the barrier layer, or, if more than one barrier layer is present, the at least one external surface may be in direct contact with the top barrier layer. The barrier layer may comprise a polymer, for example, polyvinyl alcohol, polyvinyl pyrrolidone, gelatin, cellulose ethers, polyoxazolines, polyvinylacetamides, partially hydrolyzed polyvinyl acetate/vinyl alcohol, polyacrylic acid, polyacrylamide, polyalkylene oxide, sulfonated or phosphated polyesters and polystyrenes, casein, zein, albumin, chitin, chitosan, dextran, pectin, collagen derivatives, collodian, agar-agar, arrowroot, guar, carrageenan, starch, tragacanth, xanthan, rhamsan, poly(styrene-co-butadiene), polyurethane latex, polyester latex, poly(n-butyl acrylate), poly(n-butyl methacrylate), poly(2-ethylhexyl acrylate), copolymers of n-butylacrylate and ethylacrylate, copolymers of vinylacetate and n-butylacrylate, and the like and mixtures thereof. Further examples of suitable barrier layers are homopolymers or copolymers of acrylic and/or methacrylic acids, itaconic acid, and acid esters, such as e.g. ethylacrylate, butyl acrylate, styrene, unsubstituted or substituted vinyl chloride, vinyl acetate, ethylene, butadiene, acrylamides and acrylonitriles, silicone resins, water dilutable alkyd resins, acrylic/alkyd resin combinations, natural oils such as linseed oil, and mixtures thereof. According to one embodiment, the barrier layer comprises latexes, polyolefins, polyvinylalcohols, kaolin, talcum, mica for creating tortuous structures (stacked structures), and mixtures thereof.

According to still another embodiment of the present invention, the substrate comprises one or more precoating and barrier layers between the substrate and the at least one external surface comprising a salifiable alkaline or alkaline earth compound. In this case, the at least one external surface may be in direct contact with the top precoating layer or barrier layer, respectively.

According to one embodiment of the present invention, the substrate of step a) is prepared by
  i) providing a substrate,
  ii) applying a coating composition comprising a salifiable alkaline or alkaline earth compound on at least one side of the substrate to form a coating layer, and
  iii) optionally, drying the coating layer.

The coating composition can be in liquid or dry form. According to one embodiment, the coating composition is a dry coating composition. According to another embodiment, the coating composition is a liquid coating composition. In this case, the coating layer may be dried.

According to one embodiment of the present invention, the coating composition is an aqueous composition, i.e. a composition containing water as the only solvent. According to another embodiment, the coating composition is a non-aqueous composition. Suitable solvents are known to the skilled person and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water.

According to one embodiment of the present invention, the solids content of the coating composition is in the range from 5 wt.-% to 75 wt.-%, preferably from 20 to 67 wt.-%, more preferably from 30 to 65 wt.-%, and most preferably from 50 to 62 wt.-%, based on the total weight of the composition. According to a preferred embodiment, the coating composition is an aqueous composition having a solids content in the range from 5 wt.-% to 75 wt.-%, preferably from 20 to 67 wt.-%, more preferably from 30 to 65 wt.-%, and most preferably from 50 to 62 wt.-%, based on the total weight of the composition.

According to one embodiment of the present invention, the coating composition has a Brookfield viscosity of between 10 and 4000 mPa·s at 20° C., preferably between 100 and 3500 mPa·s at 20° C., more preferably between 200 and 3000 mPa·s at 20° C., and most preferably between 250 and 2000 mPa·s at 20° C.

According to one embodiment, method steps ii) and iii) are also carried out on the reverse side of the substrate to manufacture a substrate being coated on the first and the reverse side. These steps may be carried out for each side separately or may be carried out on the first and the reverse side simultaneously.

According to one embodiment of the present invention, method steps ii) and iii) are carried out two or more times using a different or the same coating composition.

According to one embodiment of the present invention, one or more additional coating compositions are applied onto at least one side of the substrate before method step ii). The additional coating compositions may be precoating compositions and/or a barrier layer compositions.

The coating compositions may be applied onto the substrate by conventional coating means commonly used in this art. Suitable coating methods are, e.g., air knife coating, electrostatic coating, metering size press, film coating, spray coating, wound wire rod coating, slot coating, slide hopper coating, gravure, curtain coating, high speed coating and the like. Some of these methods allow for simultaneous coatings of two or more layers, which is preferred from a manufacturing economic perspective. However, any other coating method which would be suitable to form a coating layer on the substrate may also be used. According to an exemplary embodiment, the coating composition is applied by high speed coating, metering size press, curtain coating, spray coating, flexo and gravure, or blade coating, preferably curtain coating.

According to step iii), the coating layer formed on the substrate is dried. The drying can be carried out by any method known in the art, and the skilled person will adapt the drying conditions such as the temperature according to his process equipment. For example, the coating layer can be dried by infrared drying and/or convection drying. The drying step may be carried out at room temperature, i.e. at a temperature of 20° C.±2° C. or at other temperatures. According to one embodiment, method step iii) is carried out at substrate surface temperature from 25 to 150° C., preferably from 50 to 140° C., and more preferably from 75 to 130° C. Optionally applied precoating layers and/or barrier layers can be dried in the same way.

After coating, the coated substrate may be subject to calendering or super-calendering to enhance surface smoothness. For example, calendering may be carried out at a temperature from 20 to 200° C., preferably from 60 to 100° C. using, for example, a calender having 2 to 12 nips. Said nips may be hard or soft, hard nips, for example, can be made of a ceramic material. According to one exemplary embodiment, the coated substrate is calendered at 300 kN/m to obtain a glossy coating. According to another exemplary embodiment, the coated substrate is calendered at 120 kN/m to obtain a matt coating.

According to one embodiment, the coating layer has a coat weight from 0.5 to 100 g/m$^2$, preferably from 1 to 75 g/m$^2$, more preferably from 2 to 50 g/m$^2$, and most preferably from 4 to 25 g/m$^2$.

Method Step b)

According to step b) of the method of the present invention, a liquid treatment composition comprising at least one acid is provided.

The liquid treatment composition may comprise any inorganic or organic acid that forms $CO_2$ when it reacts with a salifiable alkaline or alkaline earth compound. According to one embodiment, the at least one acid is an organic acid, preferably a monocarboxylic, dicarboxylic or tricarboxylic acid.

According to one embodiment, the at least one acid is a strong acid having a $pK_a$ of 0 or less at 20° C. According to another embodiment, the at least one acid is a medium-strong acid having a $pK_a$ value from 0 to 2.5 at 20° C. If the $pK_a$ at 20° C. is 0 or less, the acid is preferably selected from sulphuric acid, hydrochloric acid, or mixtures thereof. If the $pK_a$ at 20° C. is from 0 to 2.5, the acid is preferably selected from $H_2SO_3$, $H_3PO_4$, oxalic acid, or mixtures thereof. However, acids having a $pK_a$ of more than 2.5 may also be used, for example, suberic acid, succinic acid, acetic acid, citric acid, formic acid, sulphamic acid, tartaric acid, benzoic acid, or phytic acid.

According to one embodiment of the present invention, the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulfur compounds, acidic organophosphorus compounds, and mixtures thereof. According to a preferred embodiment, the at least one acid is selected from the group consisting of hydrochloric acid, sulphuric acid, sulphurous acid, phosphoric acid, oxalic acid, boric acid, suberic acid, succinic acid, sulphamic acid, tartaric acid, and mixtures thereof, more preferably the at least one acid is selected from the group consisting of sulphuric acid, phosphoric acid, boric acid, suberic acid, sulphamic acid, tartaric acid, and mixtures thereof, and most preferably the at least one acid is phosphoric acid and/or sulphuric acid.

Acidic organosulfur compounds may be selected from sulfonic acids such as Nafion, p-toluenesulfonic acid, methanesulfonic acid, thiocarboxylic acids, sulfinic acids and/or sulfenic acids. Examples for acidic organophosphorus compounds are aminomethylphosphonic acid, 1-hydroxyethylidene-1,1-diphosphonic acid (HEDP), amino tris(methylenephosphonic acid) (ATMP), ethylenediamine tetra (methylene phosphonic acid) (EDTMP), tetramethylenediamine tetra(methylene phosphonic acid) (TDTMP), hexamethylenediamine tetra(methylene phosphonic acid) (HDTMP), diethylenetriamine penta(methylene phosphonic acid) (DTPMP), phosphonobutane-tricarboxylic acid (PBTC), N-(phosphonomethyl)iminodiacetic acid (PMIDA), 2-carboxyethyl phosphonic acid (CEPA), 2-hydroxyphosphonocarboxylic acid (HPAA), Amino-tris-(methylene-phosphonic acid) (AMP), or di-(2-ethylhexyl) phosphoric acid.

The at least one acid may consist of only one type of acid. Alternatively, the at least one acid can consists of two or more types of acids.

The at least one acid may be applied in concentrated form or in diluted form. According to one embodiment of the present invention, the liquid treatment composition comprises at least one acid and water. According to another embodiment of the present invention, the liquid treatment composition comprises at least one acid and a solvent. According to another embodiment of the present invention, the liquid treatment composition comprises at least one acid, water, and a solvent. Suitable solvents are known in the art and are, for example, aliphatic alcohols, ethers and diethers having from 4 to 14 carbon atoms, glycols, alkoxylated glycols, glycol ethers, alkoxylated aromatic alcohols, aromatic alcohols, mixtures thereof, or mixtures thereof with water. According to one exemplary embodiment, the liquid treatment composition comprises phosphoric acid, ethanol, and water, preferably the liquid treatment composition comprises 30 to 50 wt.-% phosphoric acid, 10 to 30 wt.-% ethanol, and 25 to 25 wt.-% water, based on the total weight of the liquid treatment composition. According to another exemplary embodiment, the liquid treatment composition comprises sulphuric acid, ethanol, and water, preferably the liquid treatment composition comprises 1 to 10 wt.-% sulphuric acid, 10 to 30 wt.-% ethanol, and 70 to 90 wt.-% water, based on the total weight of the liquid treatment composition.

According to one embodiment, the liquid treatment composition comprises the at least one acid in an amount from 0.1 to 100 wt.-%, based on the total weight of the liquid treatment composition, preferably in an amount from 1 to 80 wt.-%, more preferably in an amount from 2 to 50 wt.-%, and most preferably in an amount from 5 to 30 wt.-%.

In addition to the at least one acid, the liquid treatment composition may further comprise a fluorescent dye, a phosphorescent dye, an ultraviolet absorbing dye, a near infrared absorbing dye, a thermochromic dye, a halochromic dye, metal ions, transition metal ions, magnetic particles, or a mixture thereof. Such additional compounds can equip the created hidden pattern with additional features, such as specific light absorption properties, electromagnetic radiation reflection properties, fluorescence properties, phosphorescence properties, magnetic properties, electric conductivity, whiteness, brightness and/or gloss.

Method Step c)

According to step c) of the method of the present invention, the liquid treatment composition is applied onto the at least one external surface in form of a preselected pattern by inkjet printing to form a hidden pattern.

The liquid treatment composition can be applied onto the at least one external surface by any suitable inkjet printing technique known in the art. According to one embodiment, the liquid treatment composition is applied by continuous inkjet printing, intermittent inkjet printing and/or drop-on-demand inkjet printing.

It is a requirement of the present invention that the liquid treatment composition is applied in form of drops having a volume of less than or equal to 1000 pl and that the drop spacing is less than or equal to 1000 μm.

According to one embodiment, the drops have a volume from 500 pl to 1 fl, preferably from 100 pl to 10 fl, more preferably from 50 pl to 100 fl, and most preferably from 10 pl to 1 pl. According to another embodiment, the drops have a volume of less than 1000 pl, preferably less than 600 pl, more preferably less than 200 pl, even more preferably less than 80 pl, and most preferably less than 20 pl. According to still another embodiment, the drops have a volume of less than 1 pl, preferably less than 500 fl, more preferably less than 200 fl, even more preferably less than 80 fl, and most preferably less than 20 fl.

According to one embodiment the drop spacing is from 10 nm to 500 μm, preferably from 100 nm to 300 μm, more preferably from 1 μm to 200 μm, and most preferably from 5 μm to 100 μm. According to another embodiment, the drop spacing is less than 800 μm, more preferably less than 600 μm, even more preferably less than 400 μm, and most preferably less than 80 μm. According to still another embodiment, the drop spacing is less 500 nm, more preferably less than 300 nm, even more preferably less than 200 nm, and most preferably less than 80 nm. The drop spacing can also be zero, which means that the drops perfectly overlap.

The skilled person will appreciate that by controlling the drop volume, the drop diameter can be controlled, and thus, the diameter of the area which is treated with the liquid treatment composition. The distance between two successive drops is determined by the drop spacing. Therefore, by varying the drop volume and the drop spacing the resolution of the pattern can be adjusted.

According to one embodiment the hidden pattern is formed with a resolution of at least 150 dpi in the x and y directions, preferably at least 300 dpi in the x and y direction, more preferably at least 600 dpi in the x and y direction, even more preferably at least 1200 dpi, and most preferably at least 2400 dpi in the x and y direction or at least 4800 dpi in the x and y direction.

The application of the liquid treatment composition onto the at least one external surface can be carried out at a surface temperature of the substrate, which is at room temperature, i.e. at a temperature of 20±2° C., or at an elevated temperature, for example, at about 60° C. Carrying out method step c) at an elevated temperature may enhance the drying of the liquid treatment composition, and, hence, may reduce production time. According to one embodiment, method step c) is carried out at a substrate surface temperature of more than 5° C., preferably more than 10° C., more preferably more than 15° C., and most preferably more than 20° C. According to one embodiment, method step c) is carried out at a substrate surface temperature which is in the range from 5 to 120° C., more preferably in the range from 10 to 100° C., more preferably in the range from 15 to 80° C., and most preferably in the range from 20 to 60° C.

According to one embodiment, step c) comprises applying the liquid treatment composition from an ink reservoir, through a print head, and onto the at least one external surface. Preferably the temperature of the ink reservoir and/or print head is more than 5° C., preferably between 10° C. and 100° C., more preferably between 15° C. and 80° C., and most preferably between 20° C. and 60° C.

According to the method of the present invention, the liquid treatment composition is applied onto at least one external surface in form of a preselected pattern. According to one embodiment of the present invention, the preselected pattern is an one-dimensional bar code, a two-dimensional bar code, a three-dimensional bar code, a security mark, a number, a letter, an alphanumeric symbol, a logo, an image, a shape or a design. The pattern may have a resolution of more than 150 dpi, preferably more than 300 dpi, more preferably more than 600 dpi, even more preferably more than 1200 dpi, and most preferably more than 2400 dpi or more than 4800 dpi.

Without being bound to any theory, it is believed that by the application of the liquid treatment composition onto the at least one external surface, the salifiable alkaline or alkaline earth compound of the external surface reacts with the at least one acid included in the treatment composition. Thereby the salifiable alkaline or alkaline earth compound is at least partially converted into an acid salt, which may have different light scattering properties compared to the original material. In case the salifiable alkaline or alkaline earth compound is an alkaline or alkaline earth carbonate, for example, the compound would be converted by the acid treatment into a non-carbonate alkaline or alkaline earth salt.

The inventors surprisingly found that by using the inkjet printing technology very small drops of the treatment composition can be applied onto the at least one external surface, which provides to the possibility of converting even small areas of the external surface very precisely and locally without affecting the surrounding surface structure. Thereby, high resolution patterns can be created on the at least one external surface. Moreover, the method of the present invention has the advantage that it can be carried out with conventional inkjet printers just by replacing the conventional ink by the liquid treatment composition of the present invention. Thus, the method of the present invention can be implemented in existing print facilities and does not require cost-intensive and time-consuming modifications of existing inkjet printing lines.

Furthermore, the inventors surprisingly found that the created pattern was only visible when viewed under specific angles relative to the surface of the substrate, while it was hidden when viewed under other angles relative to the surface of the substrate. In other words, the present invention provides the possibility to create a hidden pattern on a substrate, which may not be visible on a first glance, but can be easily detected when varying the viewing angle. Therefore, while a potential counterfeiter may have no knowledge of the presence of the pattern, a trained person can identify the pattern immediately just by visual inspection without using any special tools. The hidden pattern created by the method of the present invention has also the advantage that is not possible to reproduce it by copying using a photocopier.

Furthermore, the present invention provides the possibility to equip said pattern with additional functionalities by adding further compounds to the liquid treatment composition. For example, the pattern can be detected under UV light by adding a UV absorbing dye or can be rendered machine readable by adding magnetic particles or electrically conductive particles. A further advantage of the present invention is that the created hidden pattern can have an embossed structure due to the conversion of the salifiable alkaline or alkaline earth compound into the corresponding acid salt, which provides the possibility of creating a pattern that blind people and partially sighted users can touch.

By applying the liquid treatment composition according to method step c), the salifiable alkaline or alkaline earth compound can be converted into a water-insoluble or water-soluble salt.

According to one embodiment, the hidden pattern comprises an acid salt of the salifiable alkaline or alkaline earth compound. According to another embodiment, the hidden pattern comprises a non-carbonate alkaline or alkaline earth salt, preferably an insoluble non-carbonate alkaline or alkaline earth salt. According to a preferred embodiment, the hidden pattern comprises a non-carbonate calcium salt, preferably an insoluble non-carbonate calcium salt. In the meaning of the present invention "water-insoluble" materials are defined as materials which, when mixed with deionised water and filtered on a filter having a 0.2 μm pore size at 20° C. to recover the liquid filtrate, provide less than or equal to 0.1 g of recovered solid material following evaporation at 95 to 100° C. of 100 g of said liquid filtrate. "Water-soluble" materials are defined as materials leading to the recovery of greater than 0.1 g of recovered solid material following evaporation at 95 to 100° C. of 100 g of said liquid filtrate.

Additional Process Steps

According to one embodiment of the invention, the method further comprises a step d) of applying a protective layer and/or a printing layer above the at least one surface-modified region. The protective layer and/or a printing layer can be a transparent layer, a semi-transparent layer, or an opaque layer.

According to one embodiment of the invention, the method further comprises a step d) of applying a protective layer above the at least one surface-modified region.

The protective layer can be made from any material, which is suitable to protect the underlying hidden pattern against unwanted environmental impacts or mechanical wear. Examples for suitable materials are resins, varnishes, silicones, polymers, metal foils, or cellulose-based materials.

The protective layer may be applied above the hidden pattern by any method known in the art and suitable for the material of the protective layer. Suitable methods are, for example, air knife coating, electrostatic coating, metering size press, film coating, spray coating, extrusion coating, wound wire rod coating, slot coating, slide hopper coating, gravure, curtain coating, high speed coating, lamination, printing, adhesive bonding, and the like.

According to one embodiment of the present invention, the protective layer is applied above the hidden pattern and the surrounding external surface.

According to one embodiment, the protective layer is a removable protective layer.

According to another embodiment of the invention, the method further comprises a step d) of applying a printing layer above the at least one surface-modified region.

The printing layer can be applied by any suitable printing technique known to the skilled person. For example, the printing layer can be created by inkjet printing, offset printing, rotogravure, flexography, or screen printing. According to one embodiment, the printing layer is an inkjet printing layer, an offset printing layer, a rotogravure printing layer, or a flexography printing layer. It will be appreciated by the skilled person that the amount of ink applied by printing techniques such as offset or rotogravure, is still far below the thickness of the surface-modified area, i.e. the hidden pattern. In other words, the amount of ink is too low in order to fill the voids and to cause disappearing of the hidden pattern. Thus, a hidden pattern, which is partially or completely covered by a printing layer, is still visible when viewed from a second angle relative to the surface of the substrate.

According to a further embodiment of the present invention, the substrate provided in step a) comprises on the first side a first external surface and on the reverse side a second external surface, wherein the first and the second external surface comprise a salifiable alkaline or alkaline earth compound, and in step c) the liquid treatment composition comprising at least one acid is applied onto the first and the second external surface on the first and the reverse side to form a hidden pattern on the first and the reverse side. Step c) may be carried out for each side separately or may be carried out on the first and the reverse side simultaneously.

According to one embodiment of the present invention, method step c) is carried out two or more times using a different or the same liquid treatment composition. Thereby, different hidden patterns with different properties can be created.

The Hidden Pattern

According to one aspect of the present invention, a substrate comprising a hidden pattern, obtainable by a method according to the present invention, is provided.

According to a further aspect of the present invention, a substrate comprising a hidden pattern is provided, wherein the substrate comprises at least one external surface comprising a salifiable alkaline or alkaline earth compound, and wherein the at least one external surface comprises at least one hidden pattern, wherein the hidden pattern comprises an acid salt of the salifiable alkaline or alkaline earth compound. Preferably, the salifiable alkaline or alkaline earth compound is an alkaline or alkaline earth carbonate, preferably a calcium carbonate, and the surface-modified region comprises a non-carbonate alkaline or alkaline earth salt, preferably a non-carbonate calcium salt.

Without being bound to any theory, the inventors believe that due to different light scattering properties of the hidden pattern and the surrounding external surface, the hidden pattern is invisible when viewed at a first angle relative to the surface of the substrate, and visible when viewed from a second angle relative to the surface of the substrate. According to one embodiment, the hidden pattern is invisible when viewed at an angle from 80° to 100°, preferably about 90°, relative to the surface of the substrate, and visible when viewed at an angle from 10° to 50°, preferably from 20 to 30°, relative to the surface of the substrate. Preferably, the hidden pattern is viewed under ambient light. The surface of the substrate relative to which the viewing angle is defined is the surface on which the hidden pattern is applied, i.e. the at least one external surface of the substrate. According to one embodiment, the hidden pattern is invisible to the un-aided or naked human eye when viewed at a first angle relative to the surface of the substrate under ambient light, and visible to the un-aided or naked human eye when viewed at a second angle relative to the surface of the substrate under ambient light.

According to one embodiment, the hidden pattern is invisible when illuminated at an angle from 80° to 100°, preferably about 90°, relative to the surface of the substrate, and visible when illuminated at an angle from 10° to 50°, preferably from 20 to 30°, relative to the surface of the substrate. According to one embodiment, the hidden pattern is invisible to the un-aided or naked human eye when illuminated at a first angle relative to the surface of the substrate, and visible to the un-aided or naked human eye when illuminated at a second angle relative to the surface of the substrate.

Additionally, the hidden pattern may differ from the surrounding external surface in further aspects, in particular if the hidden pattern comprises a further compound such as a fluorescent dye, a phosphorescent dye, an ultraviolet absorbing dye, a near infrared absorbing dye, a thermochromic dye, a halochromic dye, metal ions, transition metal ions, magnetic particles or mixtures thereof.

According to one embodiment the hidden pattern differs from the coating layer in surface roughness, gloss, light absorption, electromagnetic radiation reflection, fluorescence, phosphorescence, magnetic property, electric conductivity, whiteness and/or brightness. These distinguishable properties can be utilized to detect the hidden pattern at additional or alternative conditions, for example, under UV light or near infrared light using an appropriate detector, and can render it machine readable.

According to one embodiment the hidden pattern comprises a security feature and/or a decorative feature, preferably an one-dimensional bar code, a two-dimensional bar code, a three-dimensional bar code, a security mark, a number, a letter, an alphanumeric symbol, a logo, an image, a shape or a design. In the present context, term "security feature" means that the feature is used for the purpose of authentication, while "decorative feature" means that the feature is provided primarily for authentication, but rather primarily for a graphical or decorative purpose.

According to one embodiment, the hidden pattern displays variable information. According to another embodiment, the variable information comprises covert information and/or overt information. According to one embodiment, the hidden pattern comprises an embossed structure.

The hidden pattern may also be combined with other security features such as optically variable features, embossing, watermarks, threads, or holograms.

Generally the substrate comprising the hidden feature of the present invention may be employed in any product that is subject to counterfeiting, imitation or copying. Furthermore, the substrate comprising the hidden feature of the present invention may be employed in non-security or decorative products.

According to a further aspect of the present invention, a product comprising a substrate comprising a hidden pattern according to the present invention is provided, wherein the product is a branded product, a security document, a non-secure document, or a decorative product, preferably the product is a perfume, a drug, a tobacco product, an alcoholic drug, a pharmaceutical product, a dietary product, a bottle, a garment, a packaging, a container, a sporting good, a toy, a game, a mobile phone, a CD, a DVD, a blue ray disk, a machine, a tool, a car part, a sticker, a label, a tag, a poster, a passport, a driving license, a bank card, a credit card, a bond, a ticket, a tax stamp, a banknote, a certificate, a brand authentication tag, a business card, a greeting card, or a wall paper.

As already mentioned above, the hidden pattern according to the present invention is suitable for a wide range of applications. The skilled person will appropriately select the type of hidden pattern for the desired application.

According to one embodiment of the present invention, the substrate comprising a hidden pattern according to the present invention is used in security applications, in overt security elements, in covert security elements, in brand protection, in microlettering, in micro imaging, in decorative applications, in artistic applications, in visual applications, or in packaging applications.

The scope and interest of the present invention will be better understood based on the following figures and examples which are intended to illustrate certain embodiments of the present invention and are non-limitative.

EXAMPLES

1. Measurement Methods

Figure 1:
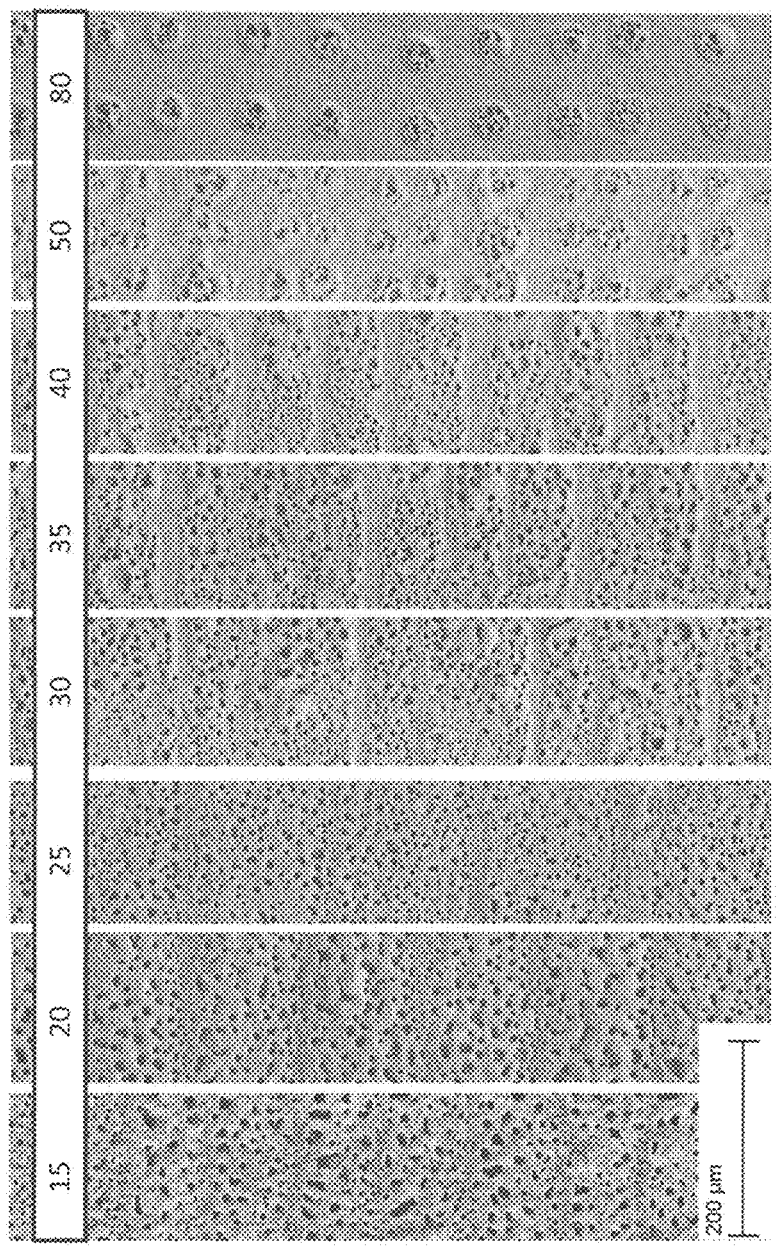
FIG. 1 shows a scanning electron microscope (SEM) micrograph of a surface comprising a coating layer, which was inkjet printed with a liquid treatment composition with different drop spacings using a drop volume of 10 pl. The numbers in the figure indicate the drop spacing in μm for the particular printed area.

In the following, measurement methods implemented in the examples are described.

Scanning Electron Microscope (SEM) Micrographs

The prepared patterned samples were examined by a Sigma VP field emission scanning electron microscope (Carl Zeiss AG, Germany) and a variable pressure secondary electron detector (VPSE) with a chamber pressure of about 50 Pa.

Optical Microscope Pictures

The prepared patterned samples were examined by a Leica MZ16A stereomicroscope (Leica Microsystems Ltd., Switzerland).

X-Ray Diffraction (XRD) Analysis

The samples were analysed with a Bruker D8 Advance powder diffractometer obeying Bragg's law. This diffractometer consisted of a 2.2 kW X-ray tube, a sample holder, a □-□ goniometer, and a VÅNTEC-1 detector. Nickel-filtered Cu Kα radiation was employed in all experiments. The profiles were chart recorded automatically using a scan speed of 0.7° per minute in 2□ (XRD GV_7600). The resulting powder diffraction pattern was classified by mineral content using the DIFFRAC$^{suite}$ software packages EVA and SEARCH, based on reference patterns of the ICDD PDF 2 database (XRD LTM_7603).

2. Materials

Salifiable Alkaline Earth Compounds

CC1: ground calcium carbonate ($d_{50}$: 1.5 μm, $d_{98}$: 10 μm), pre-dispersed slurry with solids content of 78%, commercially available from Omya AG, Switzerland.

CC2: ground calcium carbonate ($d_{50}$: 0.7 μm, $d_{98}$: 5 μm), pre-dispersed slurry with solids content of 78%, commercially available from Omya AG, Switzerland.

CC3: aragonitic precipitated calcium carbonate (A-PCC) ($d_{50}$: 0.45 μm, $d_{98}$: 2 μm), pre-dispersed slurry with solids content of 72%, commercially available from Omya AG, Switzerland.

CC4: ground calcium carbonate ($d_{50}$: 0.21 μm, $d_{98}$: 0.85 μm), pre-dispersed slurry with solids content of 55%.

CC5: ground calcium carbonate ($d_{50}$: 0.5 μm, $d_{98}$: 3 μm), pre-dispersed slurry with solids content of 78%, commercially available from Omya AG, Switzerland.

KA1: pre-dispersed kaolin slurry with solids content of 72%, fineness: residue on a 45 μm sieve (ISO 787/7), particles <2 μm (Sedigraph 5120), commercially available from Omya AG, Switzerland.

Binders

B1: Starch (C*-Film 07311), commercially available from Cargill, USA.

B2: Styrene-butadiene latex (Styronal D628), commercially available from BASF, Germany.

B3: Rheology modifier (Sterocoll FS), commercially available from BASF, Germany.

Surface-Coated Substrates

S1: Impermeable polypropylene flexible film (basis weight: 62 g/m$^2$), commercially available from Synteape/Yupo, Oji-Yuka Synthetic Paper Company Ltd., Japan.

S2: Z-Offsetkarton, Z-Mail Supra, (basis weight: 170 g/m$^2$), commercially available from Ziegler Papier, Switzerland.

Surface-coated substrates were prepared by equipping substrate S1 or S2, respectively, with one or more coating layers having the composition indicated in Table 1 below. The coating was carried out with a tabletop K202 Control Coater (RK PrintCoat Instruments Ltd., Great Britain).

TABLE 1

Composition of coating layers (wt.-% are based on the total weight of the mineral compound).

| Coating layer | Mineral compound | Binder |
|---|---|---|
| A | 100 wt.-% CC2 | 10 wt.-% B2 |
| B | 100 wt.-% CC1 | 6 wt.-% B1 |
|   |   | 3 wt.-% B2 |
|   |   | 0.05 wt.-% B3 |
| C | 70 wt.-% CC2 | 10 wt.-% B2 |
|   | 30 wt.-% KA1 |   |
| D | 100 wt.-% CC3 | 10 wt.-% B2 |
|   |   | 0.05 wt.-% B3 |
| E | 100 wt.-% CC4 | 10 wt.-% B2 |

TABLE 2

Composition of substrates (in case two coating layers are present, the first one is the pre-coating being in contact with the substrate surface and the second one represents the external surface layer).

| Surface-coated substrate | Substrate | Coating layer | Coating layer thickness [g/m$^2$] |
|---|---|---|---|
| 1 | S1 | A | 10 |
| 2 | S2 | B (pre-coat) | 20 |
|   |   | C | 15 |
| 3 | S2 | B (pre-coat) | 20 |
|   |   | D | 15 |
| 4 | S3 | B (pre-coat) | 20 |
|   |   | E | 15 |

S3: Double coated paper having a basis weight of 90 g/m$^2$. The pre-coat of the double coated baseboard had a coat weight of 10 g/m$^2$ and was composed of 100 pph CC1, and 6 pph B2. The top coat of the double coated baseboard had a coat weight of 8.5 g/m$^2$ and was composed of 100 pph CC5, and 8 pph B2.

Liquid Treatment Compositions

L1: 41 wt.-% phosphoric acid, 23 wt.-% ethanol, and 36 wt.-% water (wt.-% are based on the total weight of the liquid treatment composition).

L2: 3.7 wt.-% sulphuric acid, 19.2 wt.-% ethanol, 77.1 wt.-% water (wt.-% are based on the total weight of the liquid treatment composition).

3. Examples

Example 1—Inkjet Printing of Arrays

A preselected pattern in form of an array was created on the surface-coated substrate 1 by applying either liquid treatment composition L1 or L2. The liquid treatment compositions were deposited onto the substrate by inkjet printing using a Dimatix Materials Printer (DMP) of Fujifilm Dimatix Inc., USA, with a cartridge-based inkjet printhead having a drop volume of either 1 pl or 10 pl. The print direction was from left to right, one row (line) at a time. The liquid treatment compositions were applied onto the substrates with a drop volume of 1 pl and 10 pl, respectively, and using different drop spacings. The results of said prints were inspected visually and are compiled in Tables 3 and 4 below.

TABLE 3

Results of inkjet printing tests with different drop spacing using a drop volume of 10 pl and either liquid treatment composition L1 or L2.

| Drop spacing [μm] | Amount of liquid treatment composition [ml/m²] | Surface coverage | Amount of printed acid per area [ml/m²] | |
|---|---|---|---|---|
| | | | L1 | L2 |
| 5 | 400 | Oversaturation | 164 | 14.8 |
| 10 | 100 | Oversaturation | 41.0 | 3.70 |
| 15 | 44 | Oversaturation | 18.0 | 1.63 |
| 20 | 25 | Full coverage | 10.3 | 0.93 |
| 25 | 16 | Full coverage | 6.56 | 0.59 |
| 30 | 11 | Small gaps | 4.51 | 0.41 |
| 35 | 8.0 | Small gaps | 3.28 | 0.30 |
| 40 | 6.3 | Gaps | 2.58 | 0.23 |
| 50 | 4.0 | Individual dots | 1.64 | 0.15 |
| 60 | 2.8 | Individual dots | 1.15 | 0.10 |
| 70 | 2.0 | Individual dots | 0.82 | 0.07 |
| 80 | 1.6 | Individual dots | 0.66 | 0.06 |
| 90 | 1.2 | Individual dots | 0.49 | 0.04 |
| 100 | 1.0 | Individual dots | 0.41 | 0.04 |

TABLE 4

Results of inkjet printing tests with different drop spacing using a drop volume of 1 pl and either liquid treatment composition L1 or L2.

| Drop spacing [μm] | Amount of liquid treatment composition [ml/m²] | Surface coverage | Amount of printed acid per area [ml/m²] | |
|---|---|---|---|---|
| | | | L1 | L2 |
| 5 | 40 | Oversaturation | 16.4 | 1.48 |
| 10 | 10 | Overlapping | 4.10 | 0.37 |
| 15 | 4.4 | Full coverage | 1.80 | 0.16 |
| 20 | 2.5 | Full coverage | 1.03 | 0.093 |
| 50 | 0.4 | Individual dots | 0.16 | 0.015 |

Figure 2:
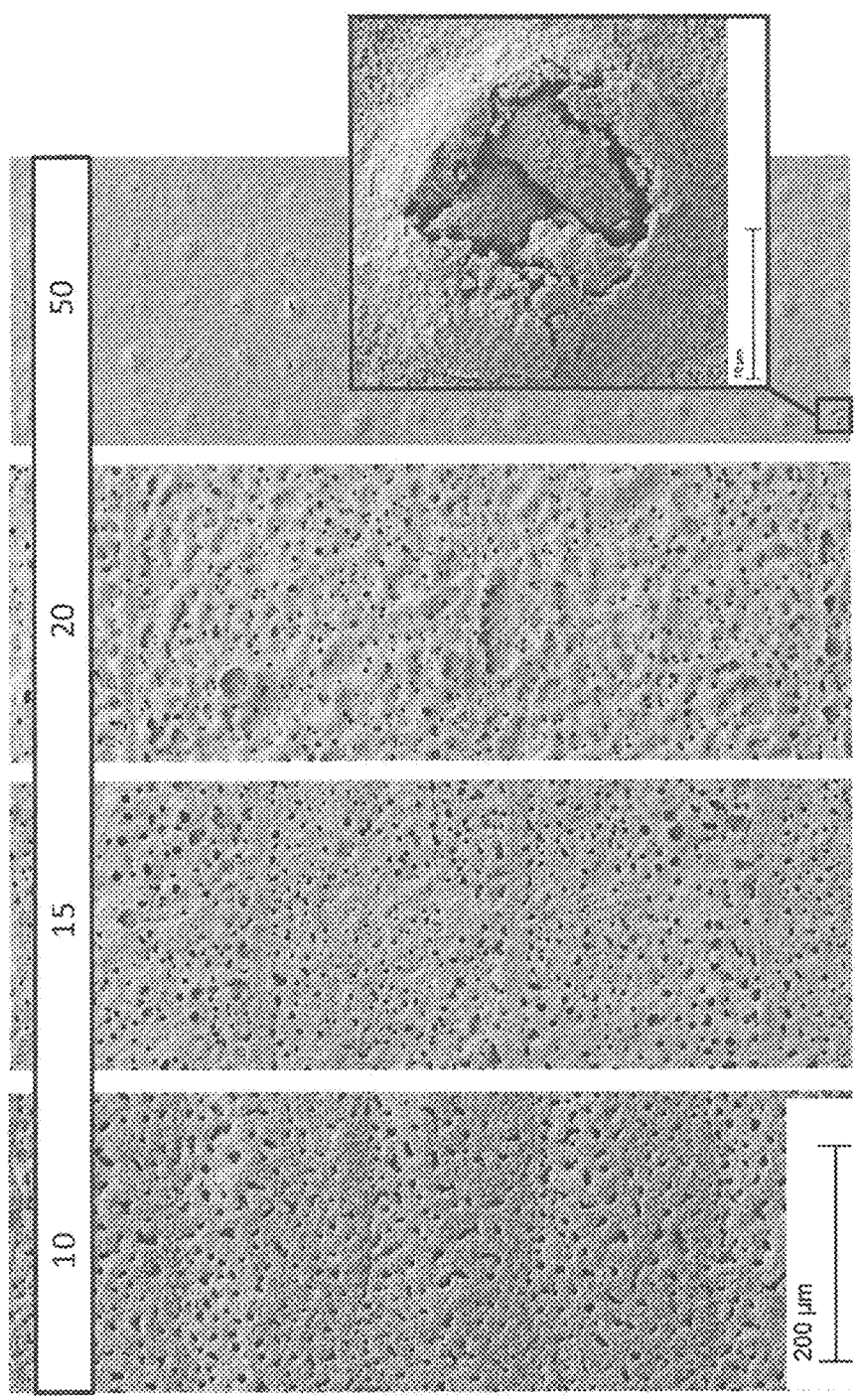
FIG. 2 shows a scanning electron microscope (SEM) micrograph of a surface comprising a coating layer, which was inkjet printed with a liquid treatment composition with different drop spacings using a drop volume of 1 pl. The numbers in the figure indicate the drop spacing in μm for the particular printed area.

FIGS. 1 and 2 show scanning electron microscope (SEM) micrographs of the substrates that were printed with liquid treatment composition L1. The numbers on the top of the figures indicate the drop spacing in m for a particular pattern. Said images clearly show that by varying the drop volume and the drop spacing filled areas, individual rows or individual dots can be prepared. In addition, FIG. 2 shows a magnified section of a surface area, wherein one single drop of the liquid treatment composition has been deposited. It can be seen from said magnification that the structure of the treated surface area differs from the surrounding surface structure.

X-ray diffraction (XRD) measurements were performed on the printed areas of the substrates printed with liquid treatment composition L1, a drop volume of 10 pl and a drop spacing of 10, 15, 20, 25, and 30 μm using rotatable PMMA specimen holder rings. Comparison of the measured data sets with ICDD reference patterns revealed that all samples consisted of calcite and additional phases, which were formed by the application of the liquid treatment composition. The results are summarized in Table 5 below.

TABLE 5

Results of XRD measurements.

| Mineral name | Formula | Drop spacing [μm] | | | | |
|---|---|---|---|---|---|---|
| | | 10 | 15 | 20 | 25 | 30 |
| Calcite | $CaCO_3$ | 23 | 22 | 38 | 39 | 55 |
| Calcium phosphate | $CaP_2O_6$ | — | 5 | 14 | 13 | 6 |
| Calcium oxide hydrate | $CaO_2(H_2O)_8$ | — | — | 17 | 16 | 5 |
| Monetite (calcium hydrogen phosphate) | $CaHPO_4$ | — | — | 20 | 21 | 28 |
| Calcium hydrogen phosphate hydrate | $Ca(H_2PO_4)_2H_2O$ | 77 | 73 | 5 | 4 | 2 |
| Calcium phosphate hydrate | $Ca_2P_2O_7 \cdot 4H_2O$ | — | — | 5 | 7 | 3 |

The results confirm that the surface of the surface-coated substrate was modified by the application of the liquid treatment composition L1 and that the hidden pattern comprises acid salts of the salifiable alkaline earth compound calcium carbonate. Since the area measured by XRD was a circle with a diameter of 6 mm, and the analysis goes "through" the substrate (not only the outermost surface is analysed), there is trend in a decreasing amount of remaining non-converted calcium carbonate (calcite) with a lower drop spacing (larger amount acid per area). With a higher amount of phosphoric acid per area, the phosphate containing compounds increase relatively.

Example 2—Inkjet Printing of a Hidden Pattern in Form of a Logo

Preselected patterns in form of a logo, two-dimensional bar code, and security marks were created on substrates 1 to 4 by applying liquid treatment composition L1. The liquid treatment composition was deposited onto the substrate by inkjet printing using a Dimatix Materials Printer (DMP) of Fujifilm Dimatix Inc., USA, with a cartridge-based inkjet printheads having a drop volume of 1 pl or 10 pl, respectively. The print direction was from left to right, one row (line) at a time. The liquid treatment composition was applied onto surface-coated substrate 1 with a drop volume of 1 pl and a drop spacing of 15 μm, and onto surface-coated substrates 2 to 4 with a drop volume of 10 pl and a drop spacing of 30 μm.

Figure 3:
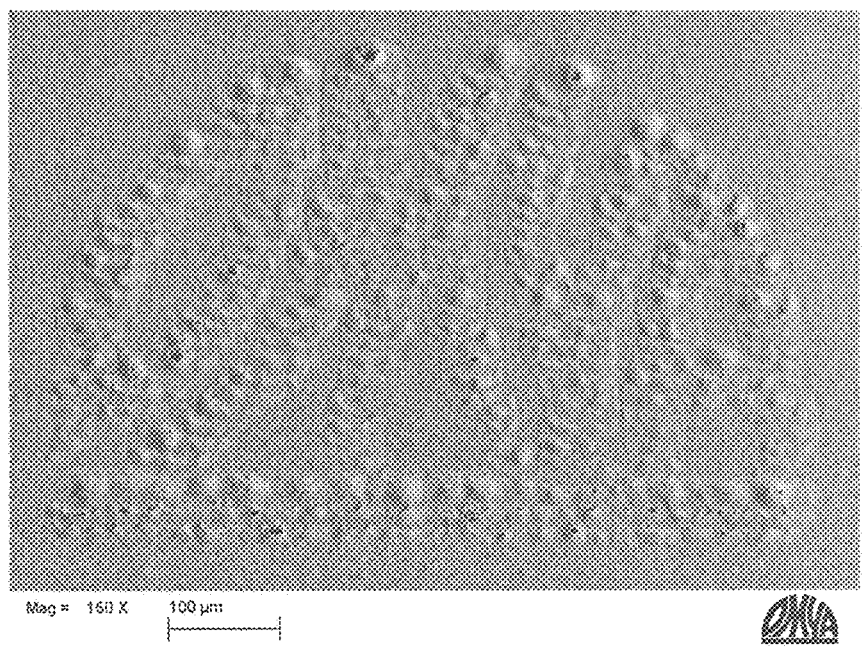
FIG. 3 shows a scanning electron microscope (SEM) micrograph of a surface comprising a coating layer and a hidden pattern in form of a logo.
Figure 4:
FIG. 4 shows an optical microscope picture of a surface comprising a coating layer and a hidden pattern in form of a logo.
Figure 5:
FIG. 5 shows an optical microscope picture of a surface comprising a coating layer and a hidden pattern in form of a logo.
Figure 6:
FIG. 6 shows an optical microscope picture of a surface comprising a coating layer and a hidden pattern in form of a logo.

The results of said prints were inspected by scanning electron and optical microscopy. A SEM micrograph of the created logo is shown in FIG. 3 and optical microscope images of the created logo are presented in FIGS. 4 to 6. As can be gathered from said images, the application of the liquid treatment composition results in a pattern on the surface-coated substrate, which clearly stands out on the remaining non-printed area.

Figure 7:
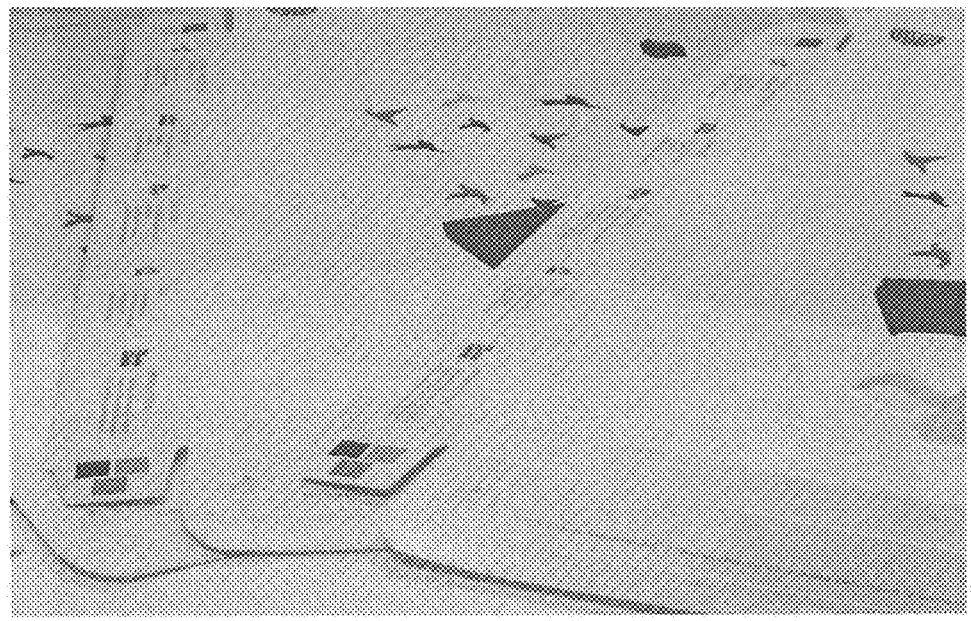
FIG. 7 shows a photograph of a packaging box, which comprises hidden patterns illuminated with top ambient light.
Figure 8:
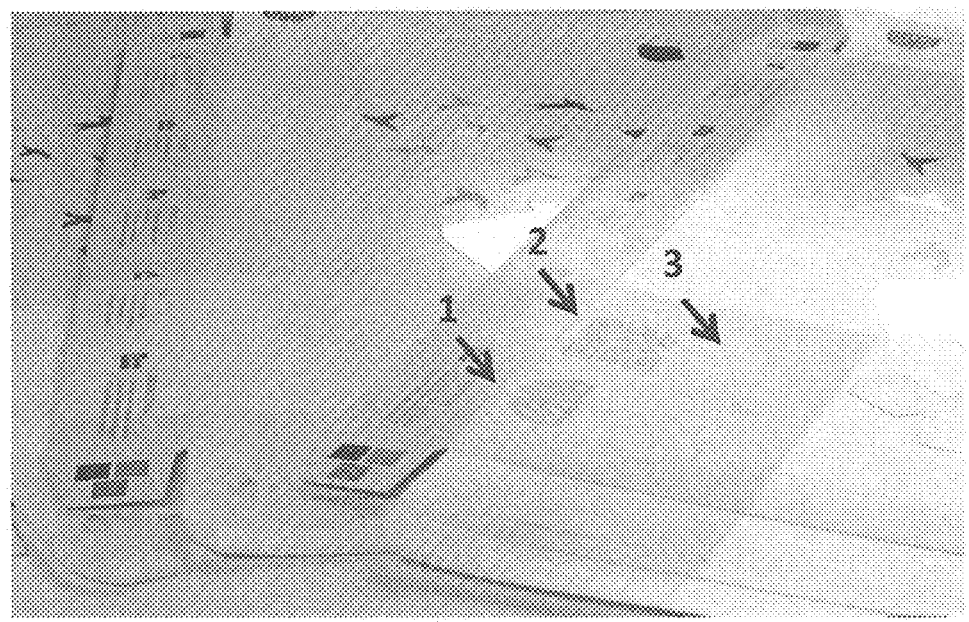
FIG. 8 shows a photograph of a packaging box, which comprises hidden patterns illuminated with ambient light at an angle of 35° relative to the surface of the substrate.
Figure 9:
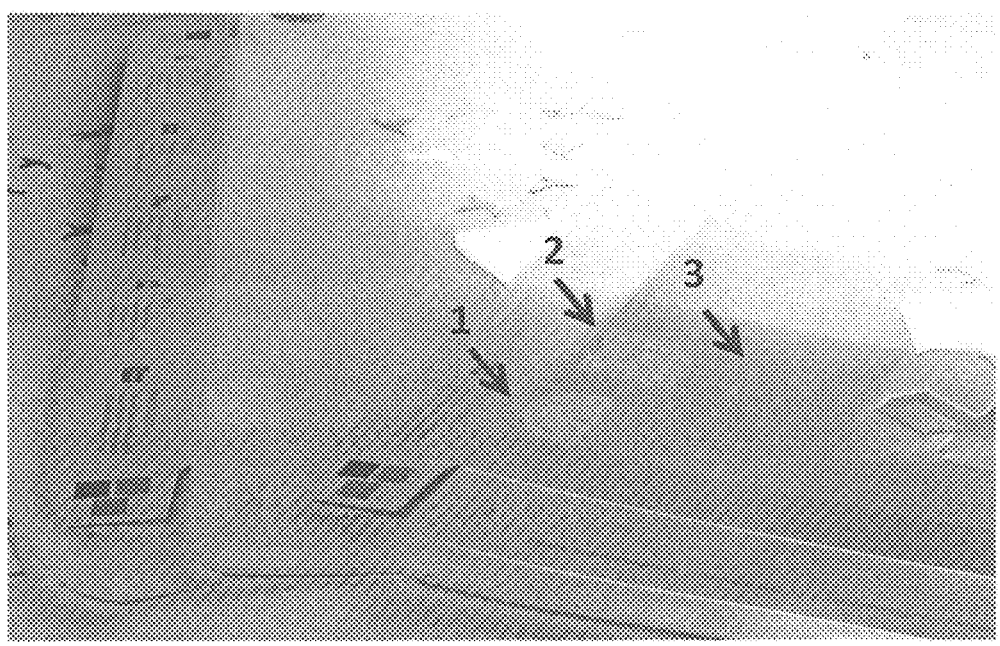
FIG. 9 shows a photograph of a packaging box, which comprises hidden patterns illuminated with ambient light at an angle of 20° relative to the surface of the substrate.

A picture of printed substrate 2 illuminated at top ambient light is shown in FIG. 7. As can be gathered from said figure, the hidden patterns are invisible for the human eye at an illumination angle of about 90° relative to the surface of the substrate. FIGS. 8 and 9 show the same printed substrate at an illumination angle of 35°±5° and 20°±5°, respectively. These figures show that by decreasing the illumination angle the hidden logo (1), the hidden two-dimensional bar code (2), and the hidden security marks (3) become visible. For illumination a RB 5055 HF Lighting Unit (Kaiser Fototechnik GmbH & Co. KG, Germany) was used. The printed substrates were placed in the centre of the mid table of the lighting unit and were illuminated with one of the two lamps, wherein the distance between the substrates and the centre of the lamp was about 50 cm.

Example 3—Inkjet Printing of a Hidden Pattern in Form of a Logo on a Tablet

A preselected pattern in form of a logo was created on the surface of a commercially available effervescent calcium carbonate containing tablet (Calcium-Sandoz® forte 500 mg, Hexal AG, Germany), by applying liquid treatment composition L1. The liquid treatment composition was deposited onto the tablet by inkjet printing using a Dimatix Materials Printer (DMP) of Fujifilm Dimatix Inc., USA, with a cartridge-based inkjet printheads having a drop volume of 10 pl. The print direction was from left to right, one row (line) at a time. The liquid treatment composition was applied onto the tablet with a drop volume of 10 pl and a drop spacing of 25 µm.

Figure 10:
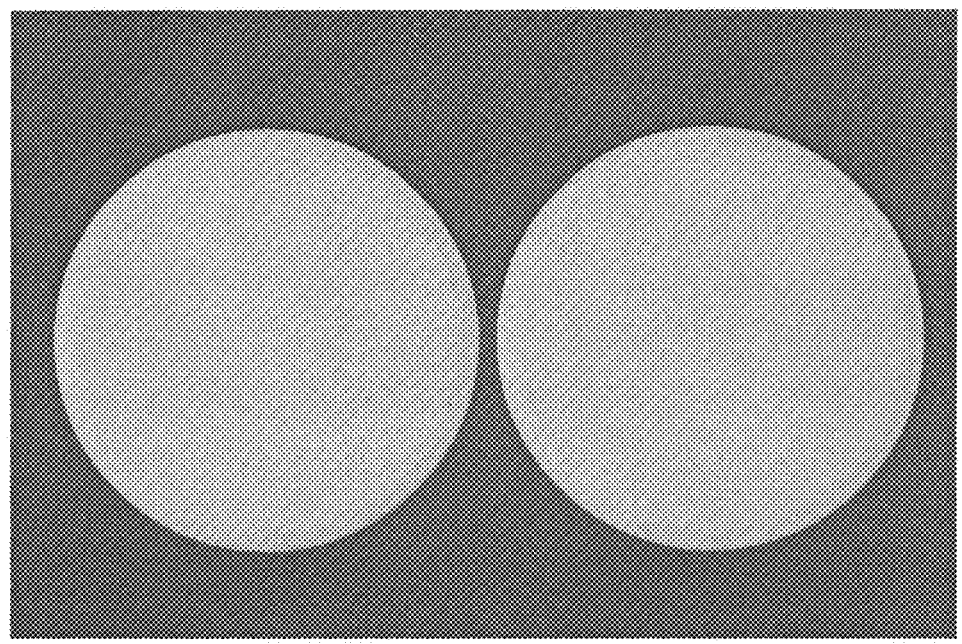
FIG. 10 shows a photograph of two dietary supplement tablets, wherein the right tablet comprises a hidden pattern, illuminated with top ambient light.
Figure 11:
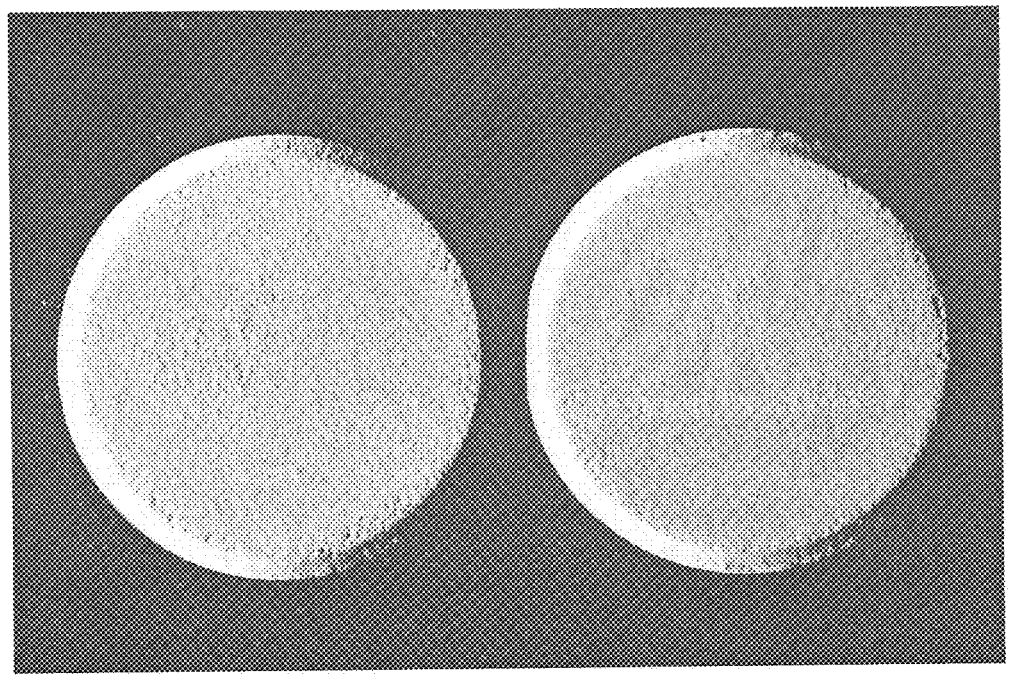
FIG. 11 shows a photograph of two dietary supplement tablets, wherein the right tablet comprises a hidden pattern, illuminated with ambient light at an angle of 20° relative to the surface of the tablet.

The result of said print was inspected visually. Pictures of the non-printed, original tablet (left tablet) and the printed tablet (right tablet) illuminated at top ambient light are shown in FIG. 10. As can be gathered from said figure, the hidden pattern is invisible for the human eye at an illumination angle of about 90° relative to the surface of the substrate. FIG. 11 shows the same tablets at an illumination angle of 20°±5°. This figure reveals that by decreasing the illumination angle the hidden logo on the right tablet become visibles. For illumination a RB 5055 HF Lighting Unit (Kaiser Fototechnik GmbH & Co. KG, Germany) was used. The printed tablets were placed in the centre of the mid table of the lighting unit and were illuminated with one of the two lamps, wherein the distance between the tablets and the centre of the lamp was about 50 cm.

Example 4—Inkjet Printing of a Hidden Pattern and Offset Overprint

Preselected patterns in form of a logo and squares were created on substrate S3 by applying liquid treatment composition L1. The liquid treatment composition was deposited onto the substrate by inkjet printing using a Dimatix Materials Printer (DMP) of Fujifilm Dimatix Inc., USA, with a cartridge-based inkjet printheads having a drop volume of 10 pl. The print direction was from left to right, one row (line) at a time. The liquid treatment composition was applied onto the substrate with a drop volume of 10 pl. The drop spacing of the squares was 25, 30, 40, 50 and 80 m and the drop spacing of the logo was 25 µm.

The patterns were overprinted with 100% coverage using a commercially available offset ink (Novavit® X 800 Skinnex®, Flint Group Germany GmbH, Germany) and the printer SeGan ISIT ink surface interaction tester (Segan, Great Britain) without the tack measuring unit.

Figure 12:
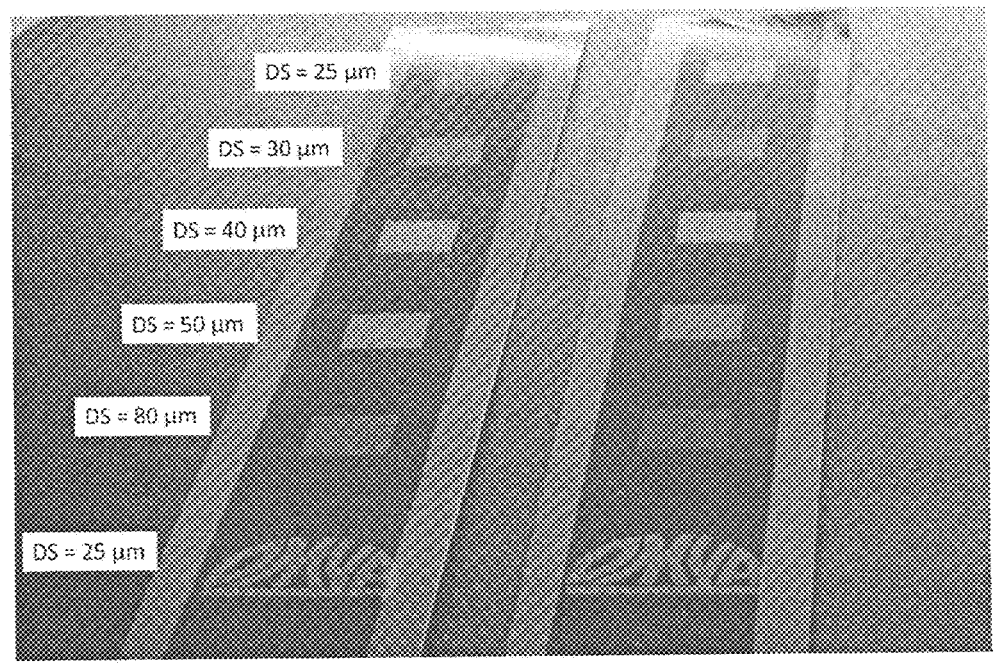
FIG. 12 shows a photograph of a printed substrate comprising a hidden pattern and an offset overprint, illuminated with ambient light at an angle of 20° relative to the surface of the substrate.

The result of said print was inspected visually. A picture of the printed substrate illuminated at an angle of 200±5° is shown in FIG. 12. As can be gathered from said figure, the hidden pattern is visible for the human eye when viewed at said angle. At an illumination angle of about 90° relative to the surface of the substrate, the squares and the logo were invisible (not shown). For illumination a RB 5055 HF Lighting Unit (Kaiser Fototechnik GmbH & Co. KG, Germany) was used. The printed substrate was placed in the centre of the mid table of the lighting unit and were illuminated with one of the two lamps, wherein the distance between the substrate and the centre of the lamp was about 50 cm.

Example 5—Inkjet Printing of a Hidden Pattern and Rotogravure Overprint

Preselected patterns in form of a logo and squares were created on substrate S3 by applying liquid treatment composition L1. The liquid treatment composition was deposited onto the substrate by inkjet printing using a Dimatix Materials Printer (DMP) of Fujifilm Dimatix Inc., USA, with a cartridge-based inkjet printheads having a drop volume of 10 pl. The print direction was from left to right, one row (line) at a time. The liquid treatment composition was applied onto the substrate with a drop volume of 10 pl. The drop spacing of the squares was 30, 40 and 50 µm and the drop spacing of the logo was 30 µm.

The patterns were overprinted with a rotogravure gradient 100% to 0% using a commercially available rotogravure ink (10-115395-5.1650, Siegwerk Druckfarben AG & Co. KGaA, Germany) and the laboratory gravure printing system Labratester I (nsm Novert Schläfli AG, Switzerland).

Figure 13:
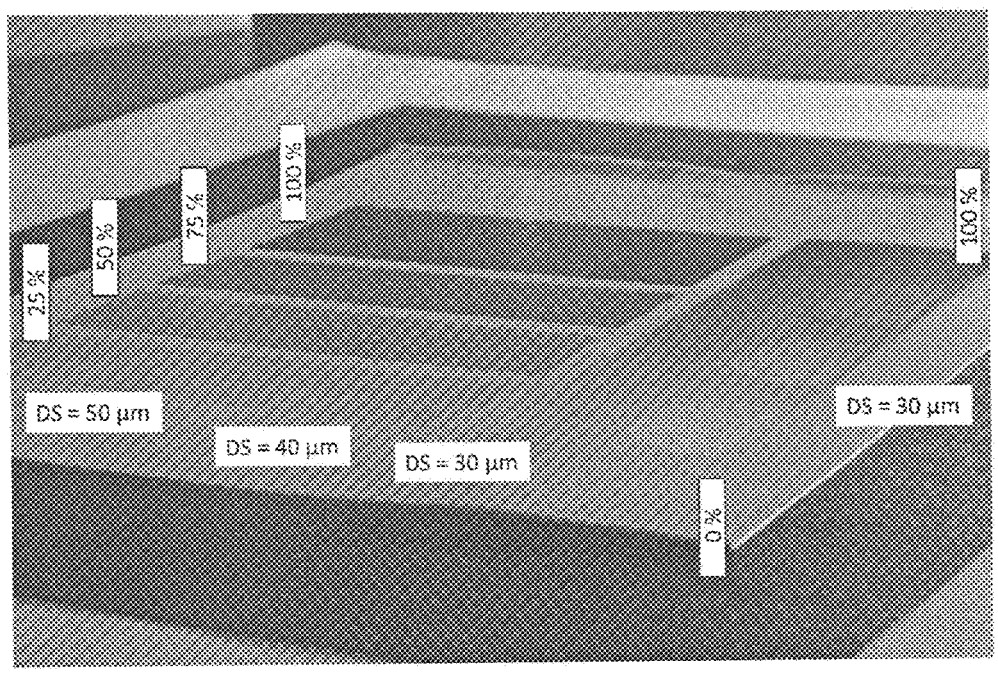
FIG. 13 shows a photograph of a printed substrate comprising a hidden pattern and a rotogravure overprint, illuminated with ambient light at an angle of 20° relative to the surface of the substrate.

The result of said print was inspected visually. A picture of the printed substrate illuminated at an angle of 20°±5° is shown in FIG. 13. As can be gathered from said figure, the hidden pattern is visible for the human eye when viewed at said angle. At an illumination angle of about 90° relative to the surface of the substrate, the squares and the logo were invisible (not shown). For illumination a RB 5055 HF Lighting Unit (Kaiser Fototechnik GmbH & Co. KG, Germany) was used. The printed substrate was placed in the centre of the mid table of the lighting unit and were illuminated with one of the two lamps, wherein the distance between the substrate and the centre of the lamp was about 50 cm.

The invention claimed is:

1. A method for creating a hidden pattern on an assembly, which is invisible when viewed at a first angle relative to a surface of the assembly, and visible when viewed from a second angle relative to the surface of the assembly, the method comprising the following steps:
   a) providing an assembly, wherein the assembly comprises (i) a substrate comprising at least one external surface of the substrate, (ii) the substrate and a laminate, or (iii) the substrate and a coating layer,
      wherein the at least one external surface, the laminate or the coating layer comprises a salifiable alkaline or alkaline earth compound,
   b) providing a liquid treatment composition comprising at least one acid, and
   c) applying the liquid treatment composition onto the at least one external surface, the laminate or the coating layer in a form of a preselected pattern by inkjet printing to form a hidden pattern created by reaction of the at least one acid of the liquid treatment composition with the salifiable alkaline or alkaline earth compound,
   wherein the liquid treatment composition is applied in a form of drops having a volume of less than or equal to 1000 pl, and at a drop spacing of less than or equal to 1000 µm.

2. The method of claim 1, wherein the assembly comprises a laminate comprising the salifiable alkaline or alkaline earth compound or a coating layer comprising the salifiable alkaline or alkaline earth compound.

3. The method of claim 1, wherein the substrate is selected from the group consisting of paper, cardboard, containerboard, plastic, non-wovens, cellophane, textile, wood, metal, glass, mica plate, marble, calcite, nitrocellulose, natural stone, composite stone, brick, concrete, and tablet, any laminate of said group, and any composite of said group.

4. The method of claim 1, wherein the substrate is paper, cardboard, containerboard or plastic.

5. The method of claim 1, wherein the assembly comprises a laminate or a coating layer, and the laminate or coating layer and the substrate of step a) are made from the same material.

6. The method of claim 1, wherein the salifiable alkaline or alkaline earth compound is an alkaline or alkaline earth oxide, an alkaline or alkaline earth hydroxide, an alkaline or alkaline earth alkoxide, an alkaline or alkaline earth methylcarbonate, an alkaline or alkaline earth hydroxycarbonate, an alkaline or alkaline earth bicarbonate, an alkaline or alkaline earth carbonate, or any mixture thereof.

7. The method of claim 1, wherein the salifiable alkaline or alkaline earth compound is lithium carbonate, sodium carbonate, potassium carbonate, magnesium carbonate, calcium magnesium carbonate, calcium carbonate, or any mixture thereof.

8. The method of claim 1, wherein the salifiable alkaline or alkaline earth compound is calcium carbonate.

9. The method of claim 1, wherein the salifiable alkaline or alkaline earth compound is ground calcium carbonate, a precipitated calcium carbonate, a surface-treated calcium carbonate, or any mixture thereof.

10. The method of claim 1, wherein the at least one acid is selected from the group consisting of hydrochloric acid, sulphuric acid, sulphurous acid, phosphoric acid, citric acid, oxalic acid, acetic acid, formic acid, sulphamic acid, tartaric acid, phytic acid, boric acid, succinic acid, suberic acid, benzoic acid, adipic acid, pimelic acid, azelaic acid, sebaic acid, isocitric acid, aconitic acid, propane-1,2,3-tricarboxylic acid, trimesic acid, glycolic acid, lactic acid, mandelic acid, acidic organosulfur compounds, acidic organophosphorus compounds, and any mixture thereof.

11. The method of claim 1, wherein the at least one acid is selected from the group consisting of hydrochloric acid, sulphuric acid, sulphurous acid, phosphoric acid, oxalic acid, boric acid, suberic acid, succinic acid, sulphamic acid, tartaric acid, and any mixture thereof.

12. The method of claim 1, wherein the at least one acid is phosphoric acid and/or sulphuric acid.

13. The method of claim 1, wherein the liquid treatment composition further comprises a fluorescent dye, a phosphorescent dye, an ultraviolet absorbing dye, a near infrared absorbing dye, a thermochromic dye, a halochromic dye, metal ions, transition metal ions, magnetic particles, or any mixture thereof.

14. The method of claim 1, wherein the liquid treatment composition comprises the acid in an amount from 0.1 to 100 wt.-%, based on a total weight of the liquid treatment composition.

15. The method of claim 1, wherein the liquid treatment composition comprises the acid in an amount from 3 to 60 wt.-%, based on a total weight of the liquid treatment composition.

16. The method of claim 1, wherein the preselected pattern is a one-dimensional bar code, a two-dimensional bar code, a three-dimensional bar code, a security mark, a number, a letter, an alphanumeric symbol, a logo, an image, a shape or a design.

17. The method of claim 1, wherein the liquid treatment composition is applied in a form of drops having a volume of from 100 pl to 10 fl.

18. The method of claim 1, wherein the liquid treatment composition is applied in a form of drops at a drop spacing of from 1 μm to 500 μm.

19. The method of claim 1, wherein the method further comprises a step d) of applying a protective layer and/or a printing layer above a region comprising the hidden pattern.

20. An assembly comprising a hidden pattern obtained by the method according to claim 1.

21. The assembly of claim 20, wherein the hidden pattern differs from the at least one external surface, the laminate, or the coating in one or more of surface roughness, gloss, light absorption, electromagnetic radiation reflection, fluorescence, phosphorescence, magnetic property, electric conductivity, whiteness and brightness.

22. The assembly of claim 20, wherein the hidden pattern comprises a security feature and/or a decorative feature.

23. The assembly of claim 20, wherein the hidden pattern comprises a one- dimensional bar code, a two-dimensional bar code, a three-dimensional bar code, a security mark, a number, a letter, an alphanumeric symbol, a logo, an image, a shape or a design.

24. A product comprising the assembly according to claim 20, wherein the product is a branded product, a security document, a non-secure document, or a decorative product, a perfume, a drug, a tobacco product, an alcoholic drug, a pharmaceutical product, a dietary product, a bottle, a garment, a packaging, a container, a sporting good, a toy, a game, a mobile phone, a CD, a DVD, a blue ray disk, a machine, a tool, a car part, a sticker, a label, a tag, a poster, a passport, a driving licence, a bank card, a credit card, a bond, a ticket, a tax stamp, a banknote, a certificate, a brand authentication tag, a business card, a greeting card, or a wall paper.

* * * * *